United States Patent
Hull et al.

(10) Patent No.: US 8,285,411 B2
(45) Date of Patent: Oct. 9, 2012

(54) REGION-BASED SUPPORTS FOR PARTS PRODUCED BY SOLID FREEFORM FABRICATION

(75) Inventors: Charles W. Hull, Santa Clarita, CA (US); Rajeev Kulkarni, Charlotte, NC (US); Medhi Mojdeh, Valencia, CA (US); Hongqing V. Wang, Ft. Mill, SC (US); John Corbin West, Mount Holly, NC (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 13/238,007

(22) Filed: Sep. 21, 2011

(65) Prior Publication Data

US 2012/0010741 A1    Jan. 12, 2012

Related U.S. Application Data

(63) Continuation of application No. 12/212,242, filed on Sep. 17, 2008, now Pat. No. 8,046,097.

(60) Provisional application No. 60/972,823, filed on Sep. 17, 2007, provisional application No. 61/055,074, filed on May 21, 2008.

(51) Int. Cl.
*G06F 19/00* (2012.01)
*G06F 7/38* (2006.01)
*B29C 47/00* (2006.01)
*B29C 35/04* (2006.01)
*G09G 5/00* (2006.01)

(52) U.S. Cl. ......... 700/119; 700/117; 700/98; 700/182; 700/194; 264/177.17; 264/401; 708/442; 345/649

(58) Field of Classification Search .......... 700/117, 700/119, 182, 194, 251, 95–98; 264/177.17, 264/401, 497, 113, 308; 708/442; 345/649–659
See application file for complete search history.

(56) References Cited

U.S. PATENT DOCUMENTS

| | | |
|---|---|---|
| 4,999,143 A | 3/1991 | Hull et al. |
| 5,454,069 A | 9/1995 | Knapp et al. |
| 5,503,785 A | 4/1996 | Crump et al. |
| 5,587,913 A | 12/1996 | Abrams et al. |
| 5,595,703 A | 1/1997 | Swaelens et al. |
| 5,943,235 A | 8/1999 | Earl et al. |
| 6,532,394 B1 | 3/2003 | Earl et al. |
| 6,558,606 B1 | 5/2003 | Kulkarni et al. |
| 6,708,071 B1 * | 3/2004 | Turner .......................... 700/98 |
| 6,797,351 B2 | 9/2004 | Kulkarni et al. |

(Continued)

OTHER PUBLICATIONS

PCT International Search Report for Application No. PCT/US2008/076648, dated Nov. 9, 2005 (5 pages).

(Continued)

*Primary Examiner* — Kakali Chaki
*Assistant Examiner* — Jason Lin
(74) *Attorney, Agent, or Firm* — Keith A. Roberson

(57) ABSTRACT

Methods for generating supports (30) for parts (50) produced by solid freeform fabrication ("SFF") are disclosed. The method includes defining a plurality of layers (L) that make up the part, and for each layer, determining those regions (R) that require support. The method also includes merging the regions for the different layers (L) into one or more common regions that require support, and providing at least one support for each of the one or more common regions. The result is that fewer supports are used as compared to conventional SFF fabrication methods.

16 Claims, 28 Drawing Sheets

U.S. PATENT DOCUMENTS

| | | |
|---|---|---|
| 6,830,643 B1 | 12/2004 | Hayes |
| 7,094,320 B1 | 8/2006 | Phan |
| 2002/0143419 A1* | 10/2002 | Praun et al. ............... 700/98 |
| 2003/0178750 A1* | 9/2003 | Kulkarni et al. ........... 264/401 |
| 2004/0008868 A1* | 1/2004 | Bornowski ................. 382/103 |
| 2004/0075196 A1 | 4/2004 | Leyden et al. |
| 2004/0251581 A1 | 12/2004 | Jang et al. |
| 2005/0131570 A1* | 6/2005 | Jamalabad et al. ......... 700/119 |
| 2005/0138885 A1 | 6/2005 | Rotherroe |
| 2006/0198975 A1* | 9/2006 | Kikuchi ...................... 428/35.8 |
| 2007/0233298 A1 | 10/2007 | Heide et al. |
| 2008/0040080 A1* | 2/2008 | Bae et al. ..................... 703/1 |
| 2008/0100326 A1* | 5/2008 | Chen et al. .................. 324/762 |
| 2008/0234687 A1* | 9/2008 | Schaller et al. ............. 606/90 |
| 2009/0001960 A1 | 1/2009 | Scotten |
| 2010/0042241 A1 | 2/2010 | Inoue |

OTHER PUBLICATIONS

PCT International Search Report for Application No. PCT/US2008/076648, dated Feb. 23, 2010 (19 pages).

PCT Written Opinion of the International Searching Authority for International Application No. PCT/US/2008/076648, dated Mar. 24, 2010 (11 pages).

* cited by examiner

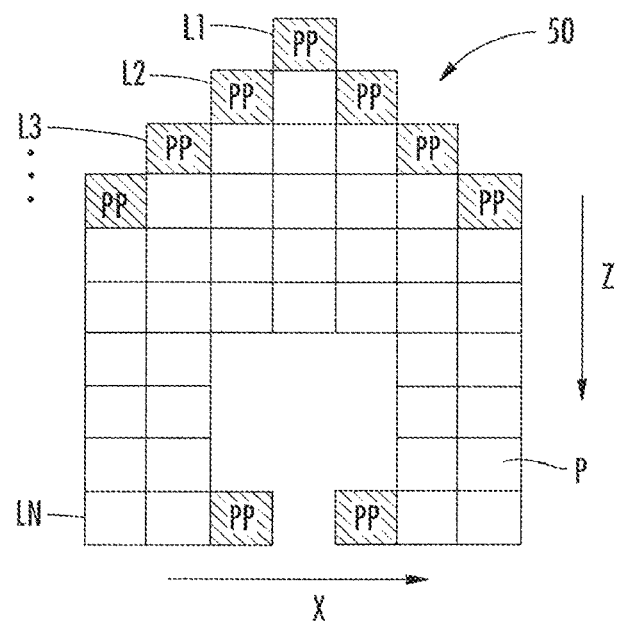
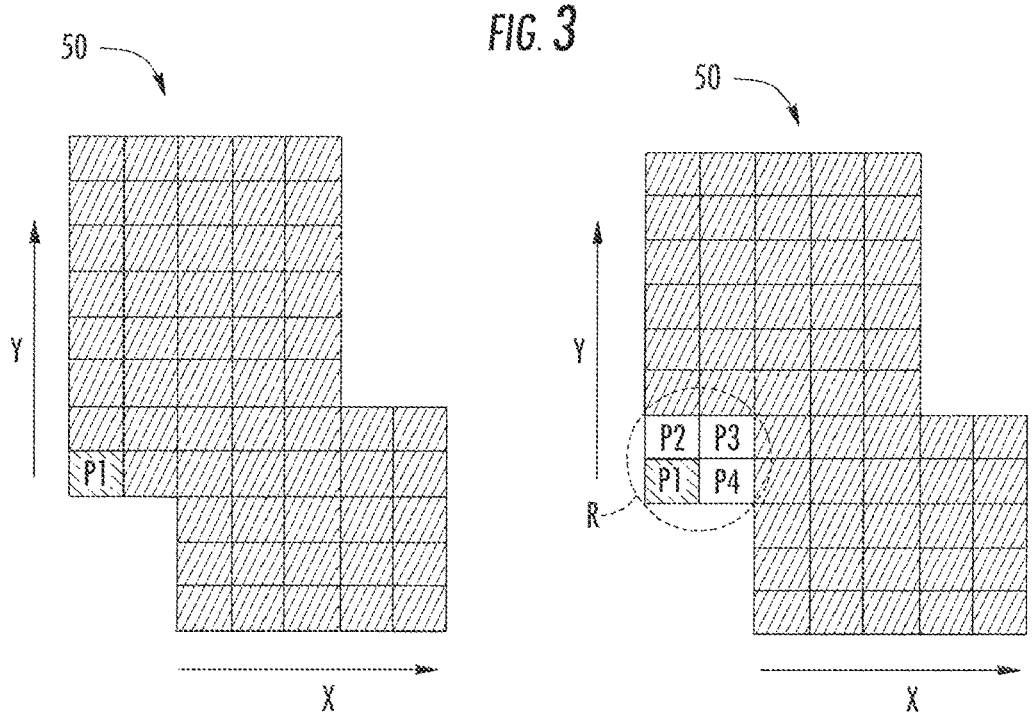
FIG. 3
FIG. 4
FIG. 5

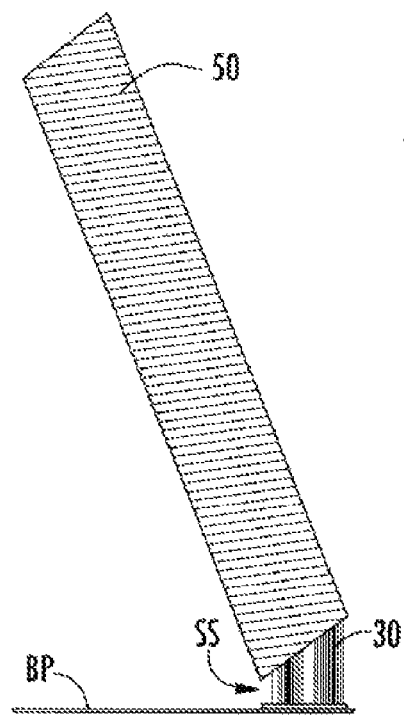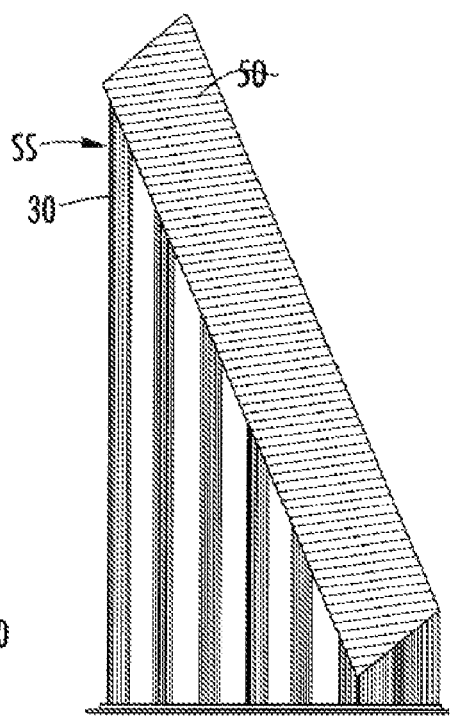
FIG. 21A
(PRIOR ART)
FIG. 21B
(PRIOR ART)
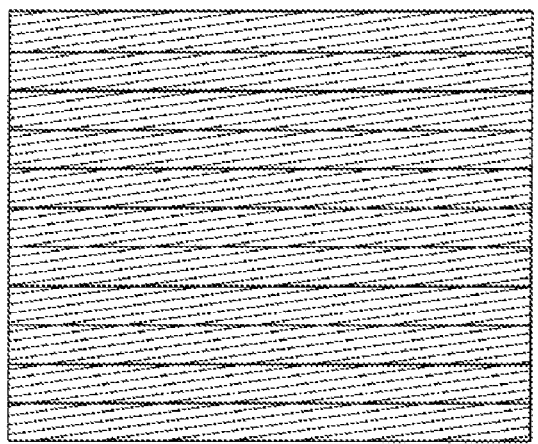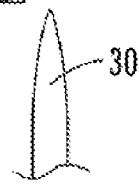
FIG. 22
(PRIOR ART)

REGION-BASED SUPPORTS FOR PARTS PRODUCED BY SOLID FREEFORM FABRICATION

CROSS REFERENCE TO RELATED APPLICATION

This application is a continuation of U.S. patent application Ser. No. 12/212,242, filed Sep. 17, 2008 now U.S. Pat. No. 8,046,097, which is hereby incorporated herein in its entirety by reference.

CLAIM OF PRIORITY

This application claims the benefit of priority under 35 U.S.C. §119(e) of U.S. Provisional Application Ser. No, 60/972,823 filed on Sep. 17, 2007, and U.S. Provisional Application Ser. No. 61/055,074 filed on May 21, 2008, which patent applications are incorporated by reference herein.

FIELD OF THE INVENTION

The present invention is related to the creation of three dimensional parts produced by solid freeform fabrication, and more particularly, to the generation of supports for the parts produced by solid freeform fabrication.

BACKGROUND OF THE INVENTION

A number of technologies presently exist for the rapid creation of models, prototypes, and objects ("parts") for limited run manufacturing. These technologies are generally called Solid Freeform Fabrication techniques, and are herein referred to as "SFF." Some SFF techniques include stereolithography, selective deposition modeling, laminated object manufacturing, selective phase area deposition, multiphase jet solidification, ballistic particle manufacturing, fused deposition modeling, particle deposition, laser sintering, film transfer imaging, and the like. Generally in SFF, complex parts are produced from a build material in an additive fashion as opposed to conventional fabrication techniques, which are generally subtractive in nature. For example, in most conventional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a build material to fabricate the part in successive layers.

SFF technologies have many advantages over conventional manufacturing methods. For instance, SFF technologies dramatically shorten the time to develop prototype parts and can produce limited numbers of parts in rapid manufacturing methods. They also eliminate the need for complex tooling and machining associated with conventional subtractive manufacturing methods, including the need to create molds for custom applications. In addition, customized parts can be directly produced from computer graphic data (e.g., computer-aided design (CAD) files) in SFF techniques.

Generally, in most techniques of SFF, structures are formed in a layer by layer manner by solidifying or curing successive layers of a build material. For example, in stereolithography a tightly focused beam of energy, typically in the ultraviolet radiation band, is scanned across sequential layers of a liquid photopolymer resin to selectively cure resin of each layer to form a multilayered part. In selective laser sintering, a tightly focused beam of energy, such as a laser beam, is scanned across sequential layers of powder material to selectively sinter or melt powder in each layer to form a multilayered part. In selective deposition modeling, a build material is jetted or dropped in discrete droplets, or extruded through a nozzle, such that the build material becomes relatively rigid upon a change in temperature and/or exposure to actinic radiation in order to build up a three-dimensional part in a layerwise fashion.

In film transfer imaging ("FTI"), a film transfers a thin coat of resin to an image plane area where portions of the resin corresponding to the cross-sectional layer of the part are selectively cured with actinic radiation to form one layer of a multilayer part.

Certain SFF techniques require the part be suspended from a supporting surface such as a build pad, a platform, or the like using supports that join the part to the supporting surface. Prior art methods for generating supports are described in U.S. Pat. Nos. 5,595,703; 6,558,606; and 6,797,351, the disclosures of which are incorporated by reference herein in their entirety. However, these prior art supports are not always adequate in certain SFF techniques that exert various external and internal forces on the part being produced and the supports that are supporting the part being produced.

Another shortcoming of prior art support-structure methods for SFF systems is that in most cases they tend to require a large amount of human interaction. Supports determined by existing support structure methods and software need to be inspected and edited manually before starting a build to ensure all the required areas are supported. This is a significant problem because it requires a large amount of human interaction even for an experienced user to edit the supports. This drastically reduces the throughput of a SFF system that has inherently being designed to be fast, quick, easy-to-use and office-friendly.

Yet another shortcoming of prior art support-structure methods for SFF systems is the creation of excessive support structures or not enough support structures. In addition, the supports may not support the exact part geometries being cured. As a result, there is a likelihood that the supports may not support the exact geometries that are actually being cured by the projected or guided light.

Another potential shortcoming that may occur when using existing stereolithography support structure methods in new solid imaging technologies, such as FTI, is the lack of variation in support geometries. Present-day supports have triangular cross-sections without the thickness varying from bottom to top. As a result, the support thickness is always one pixel wide, which requires that a large number of supports be used to adequately support the part during and after build.

BRIEF SUMMARY OF THE INVENTION

The present invention comprises various methods for producing supports for parts produced by SFF. The present invention also comprises supports (also known as "support structures") having various shapes, sizes, positions, and other properties. One exemplary embodiment comprises supports for FTI systems, in which parts are often produced upside down with supports between the part and build pad, thus requiring relatively strong supports to keep the part attached to the build pad despite relatively high removal forces that are exerted upon the part as it separates from the image plane, film surface, or other surface.

Still further embodiments provide methods of forming improved supports for alternative SFF techniques such as stereolithography and selective deposition modeling, to provide two non-limiting examples.

One aspect of the present invention is directed to a method of generating support structures for a three-dimensional part formed using SFF. The method includes slicing stereolithography (STL) models to generate part voxels; creating two-dimensional layer data and pixel data from the part voxels; applying compensation or correction on STL to correct imaging errors and to correctly position the borders using pixel blending; determining support anchors; creating support voxels; and generating the support structures for the pixel representation of the original STL model.

Additional embodiments are also described in the detailed description below.

BRIEF DESCRIPTION OF THE DRAWINGS

Figure 1:
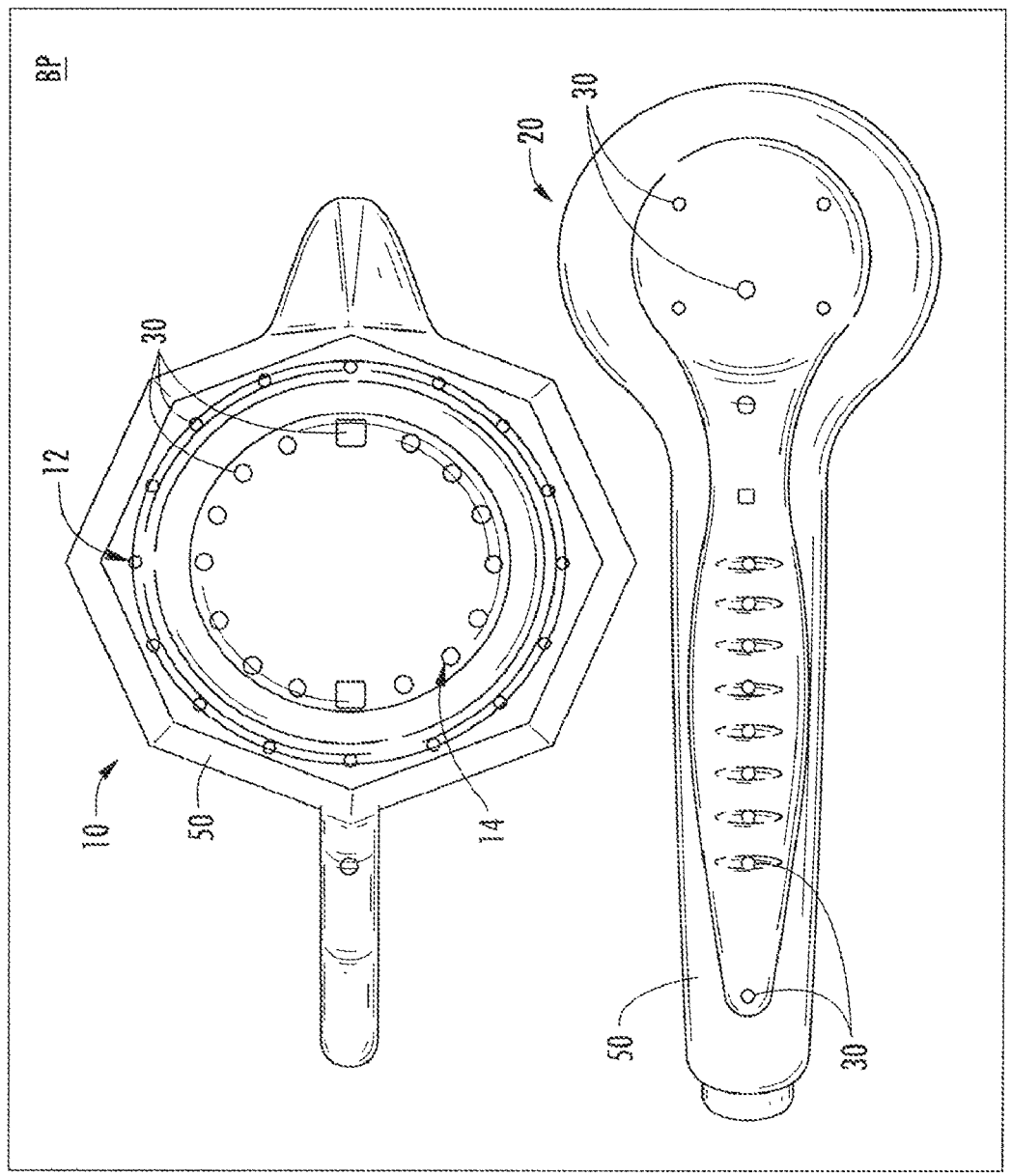
Figure 2:
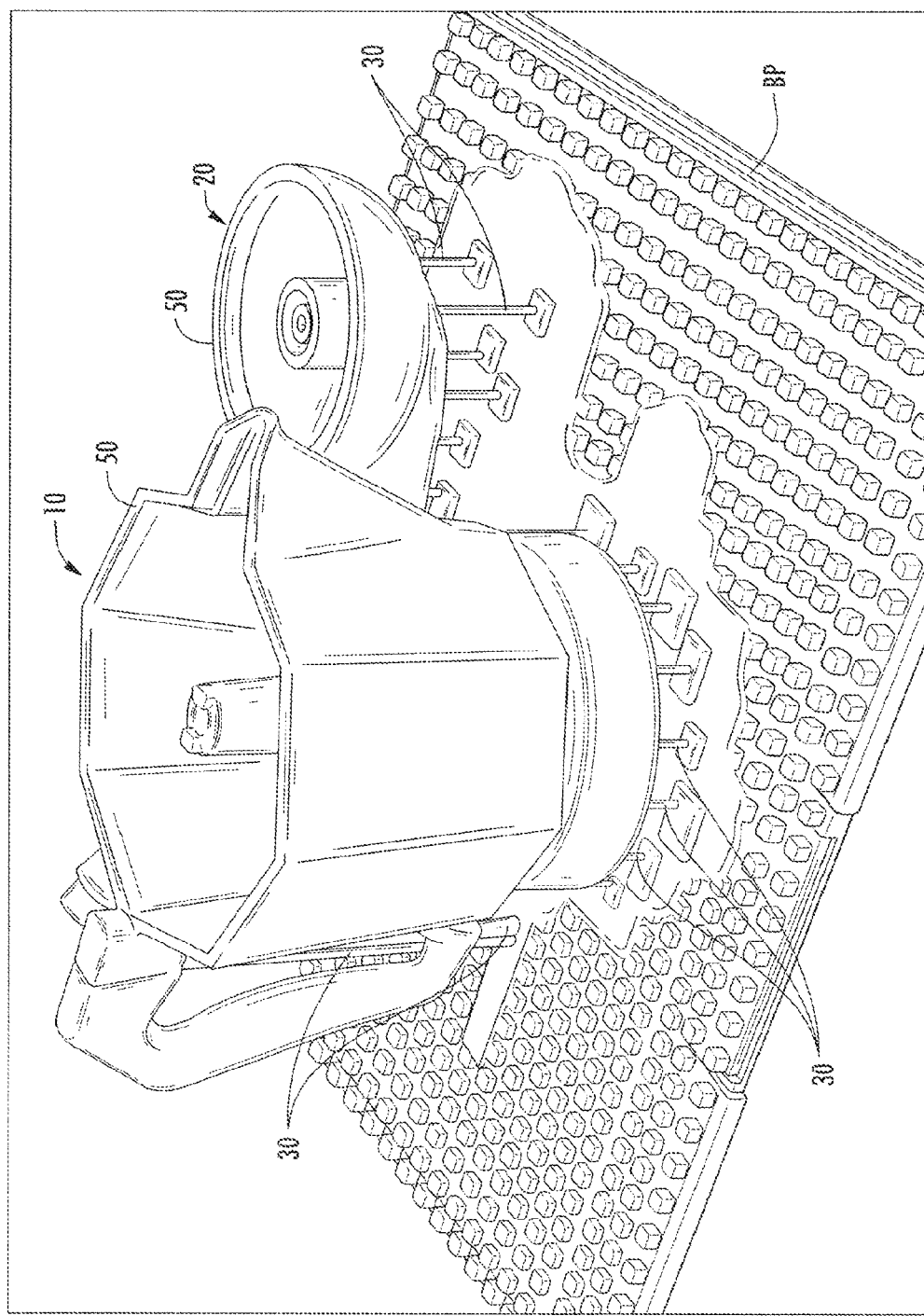
Figure 6:
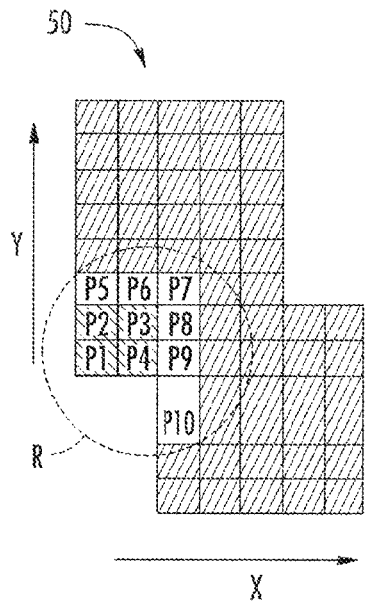
Figure 7:
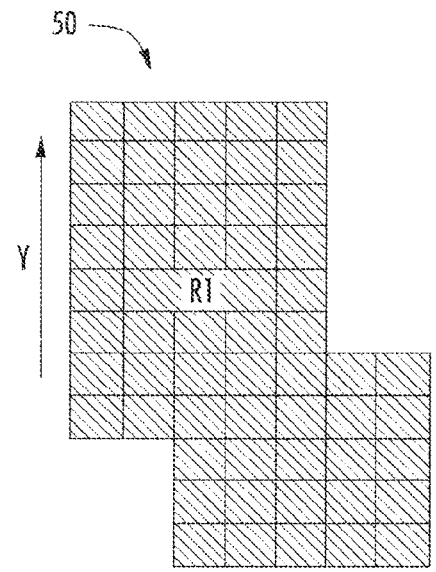
Figure 8:
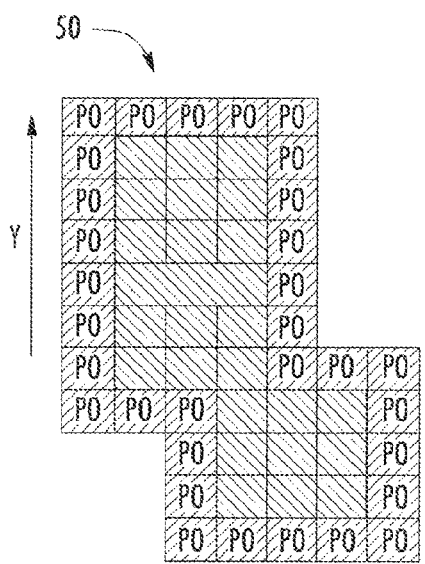
Figure 9:
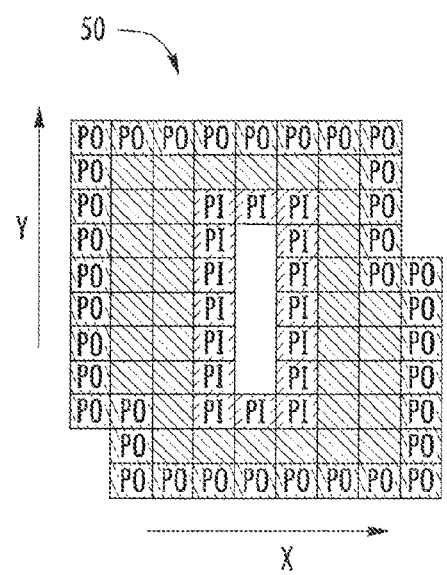
Figure 12:
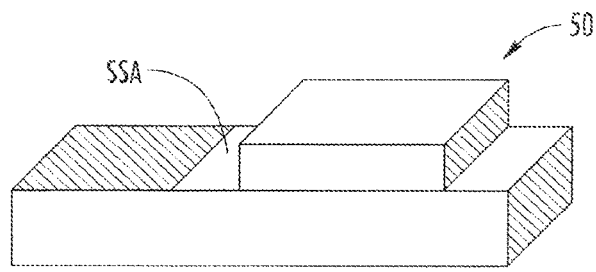
Figure 13:
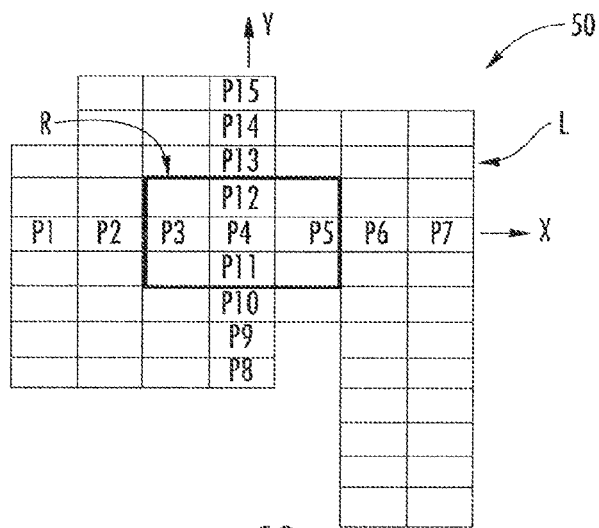
Figure 14:
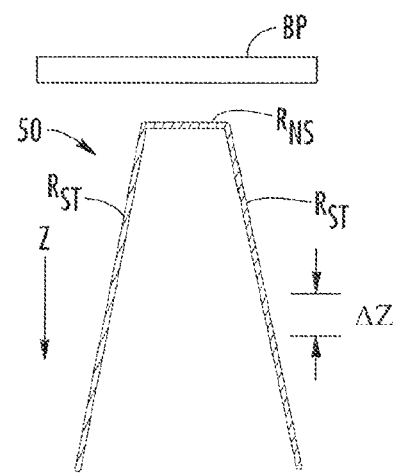
Figure 15:
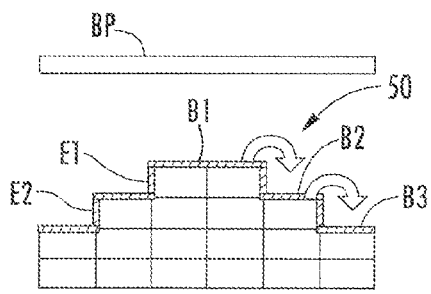
Figure 16:
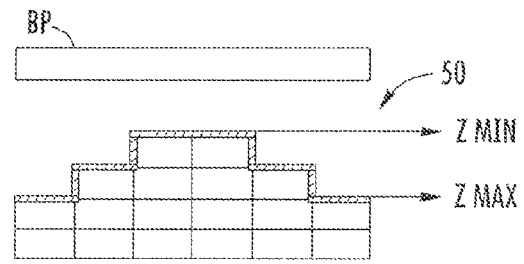
Figure 17:
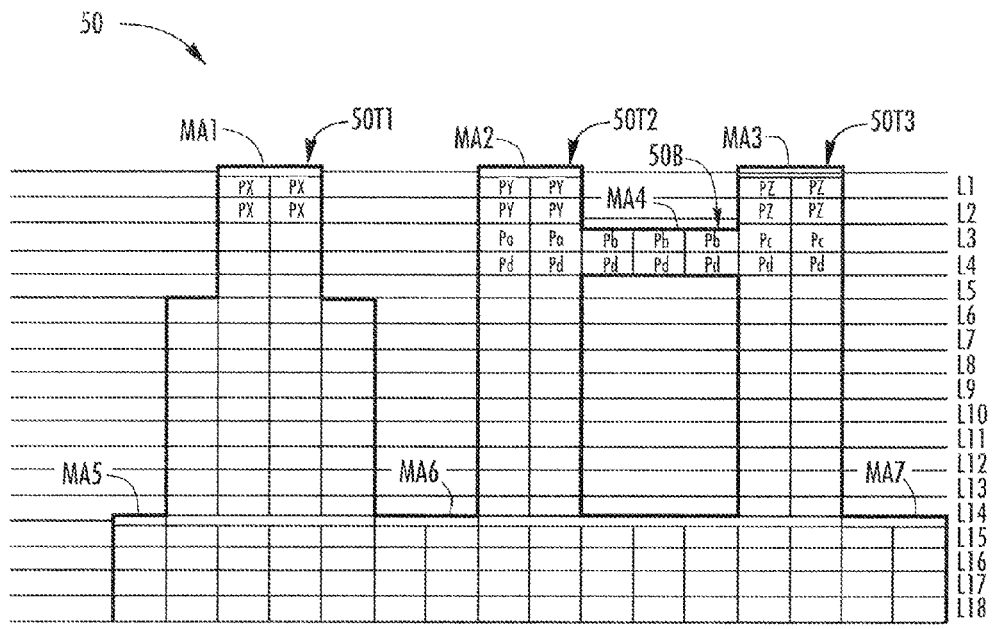
Figure 18:
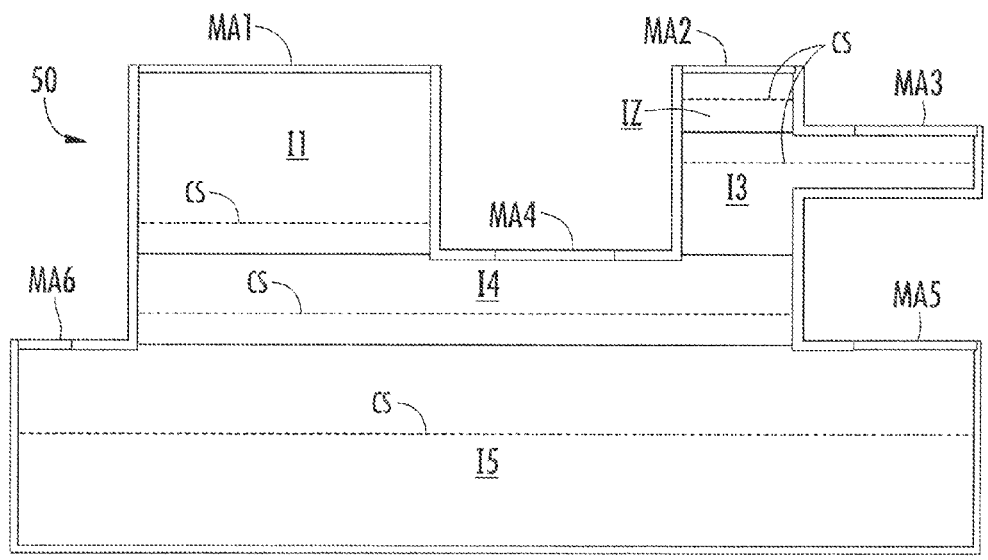
Figure 19:
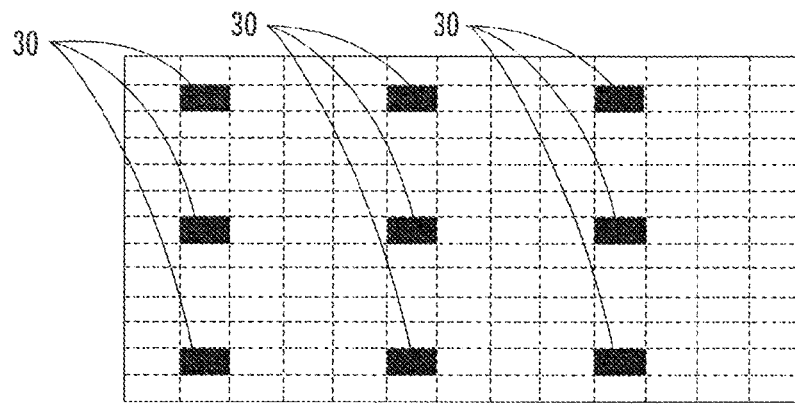
Figure 20:
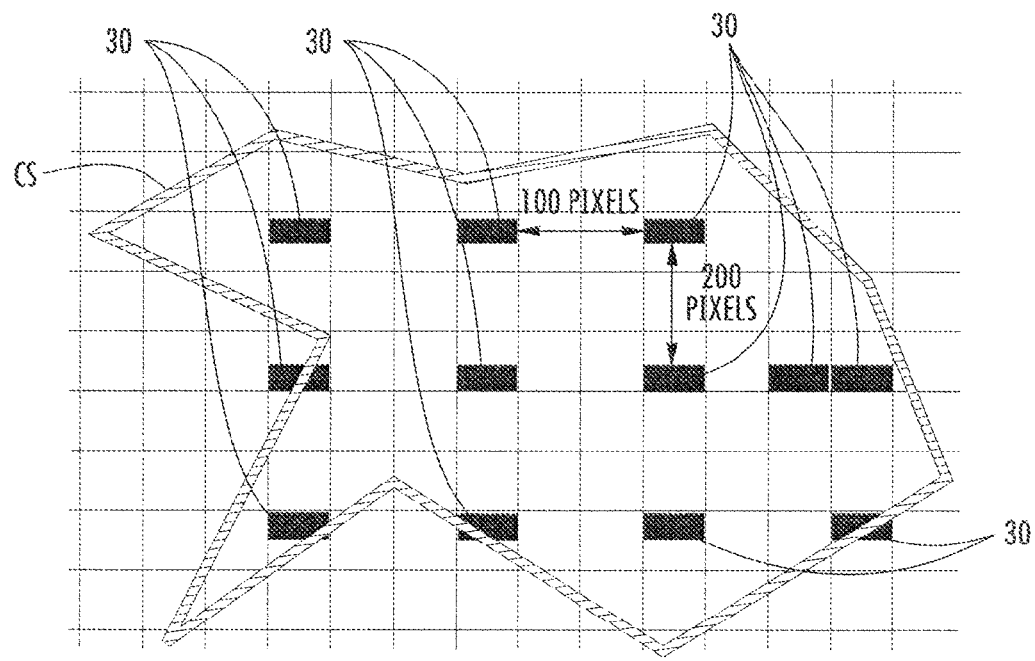

Having thus described the invention in general terms, reference is now be made to the accompanying drawings, which are not necessarily drawn to scale and are meant to be illustrative and not limiting, and wherein:

FIG. 1 is a schematic plan diagram of two parts—namely, a teapot base and a showerhead—as formed on a build pad, and showing the supports used for each part;

FIG. 2 is a perspective view of the built teapot base and the shower head on the build pad and showing the supports used to support the parts;

FIG. 3 is a schematic X-Z diagram of an example part to be built, illustrating the "Probables" pixels PP;

FIG. 4 is a X-Y schematic diagram of the top-most layer of the part of an example part to be built, showing the starting-point pixel P1;

FIG. 5 is a schematic X-Y diagram similar to FIG. 4, showing the inclusion of additional pixels in defining region R for the given layer L;

FIG. 6 is similar to FIG. 5, and shows the inclusion of even more additional pixels in defining region R;

FIG. 7 is similar to FIG. 6, and shows region R1 as being completely identified;

FIG. 8 is a X-Y schematic diagram of a part showing the outer pixels PO;

FIG. 9 is a X-Y schematic diagram of a part showing both inner and outer pixels PI and PO for a select layer of an object;

Figures 10, 11:
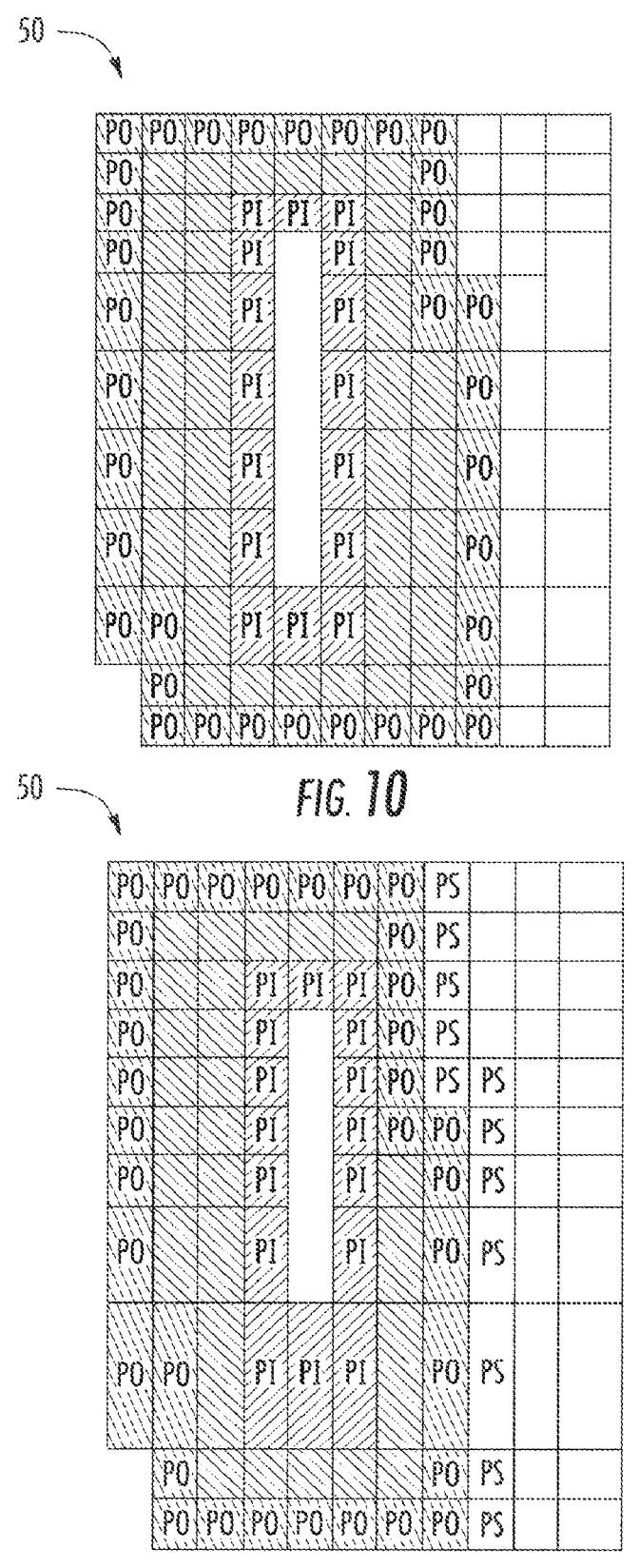

FIG. 10 and FIG. 11 are schematic diagrams of an example layer of an object illustrating the identification of self-supporting pixels by "insetting" select pixels in the region;

FIG. 12 is a perspective view of an example part that includes a self-supporting area as determined by the "insetting" method illustrated in FIGS. 10 and 11;

FIG. 13 is an example X-Y view of a region of interest R for an example object;

FIG. 14 is a X-Z view of the region of interest of FIG. 13 showing a flat top and two steep walls;

FIG. 15 is a X-Z schematic diagram of an example part relative to a build pad and showing the boundaries and edges of the part;

FIG. 16 is a X-Z schematic diagram similar to FIG. 15, showing the Zmin and Zmax values for the region;

FIG. 17 is a schematic X-Z diagram of an example part that includes a number of "islands" and a bridge-type structure;

FIG. 18 is similar to FIG. 17 and shows the identification of five different island features;

FIG. 19 is an example of a largest cross-section of a layer to be supported by support structures;

FIG. 20 is similar to FIG. 19, but that shows surface supports that lie within the part cross-section.

Figure 23:
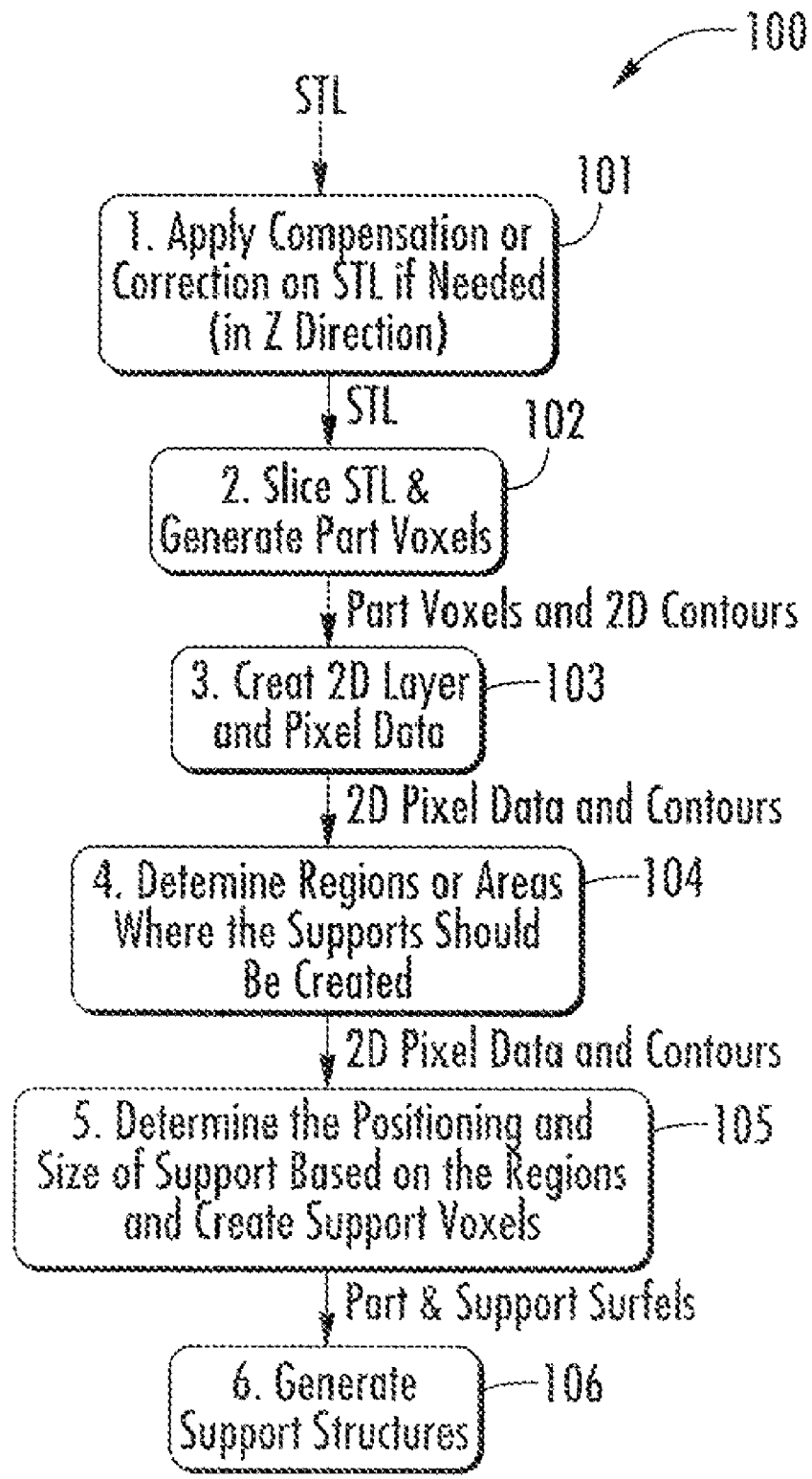
Figure 24:
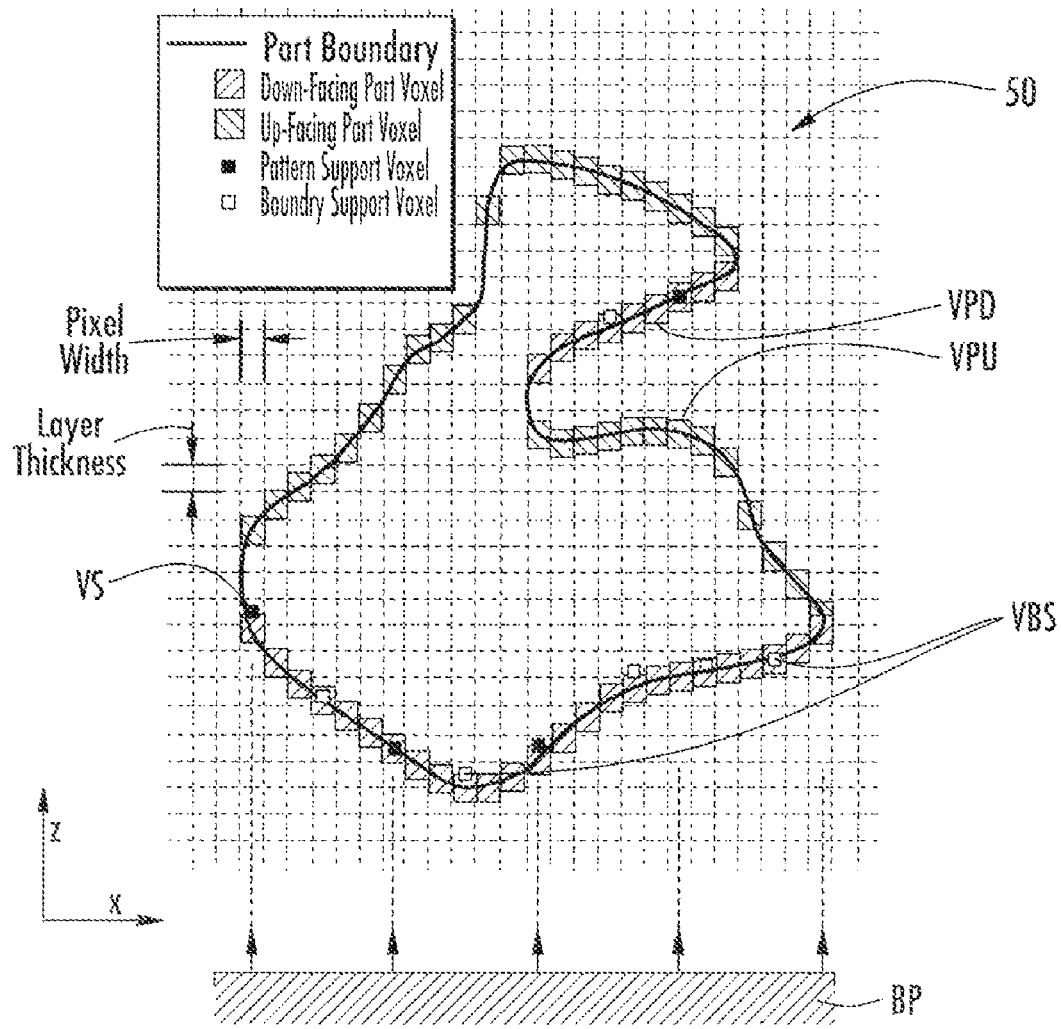
Figure 25:
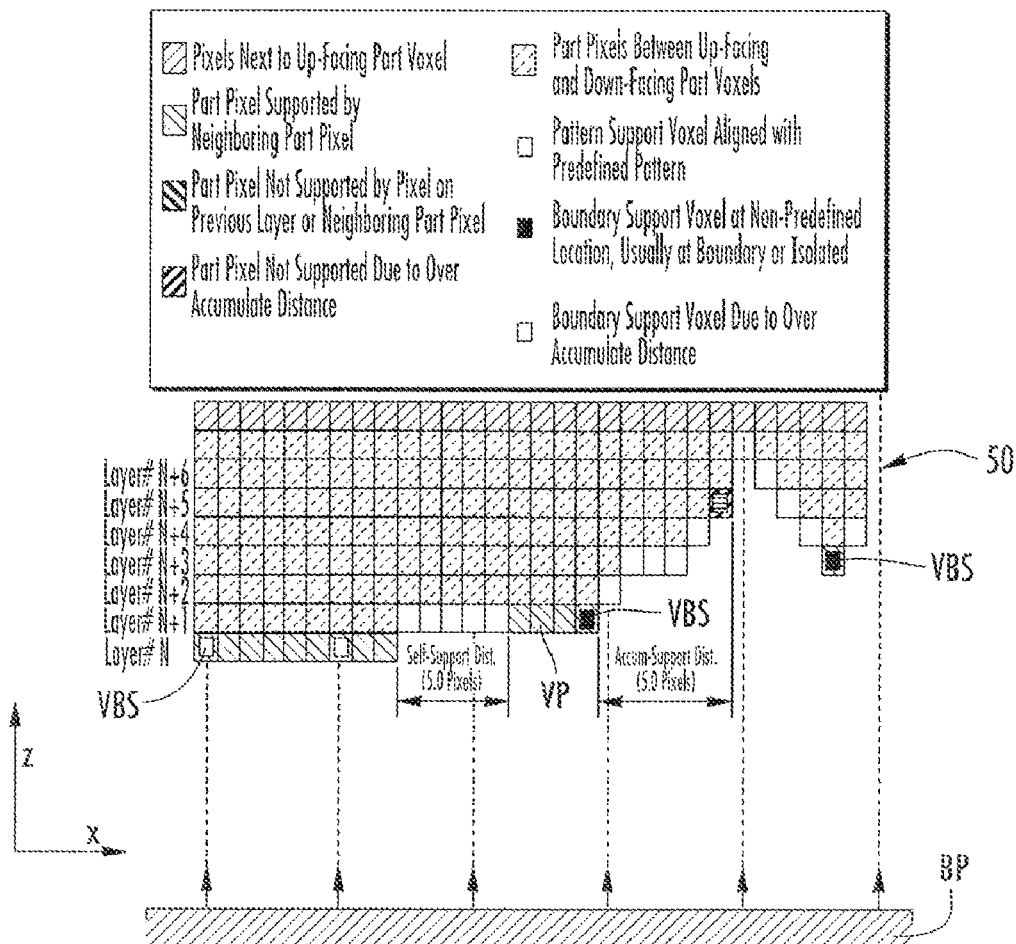
Figure 26A:
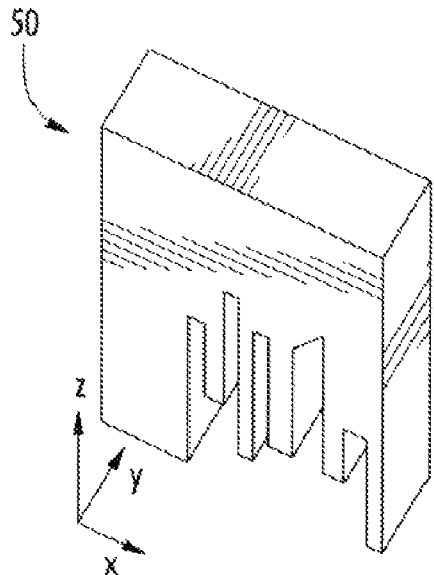
Figure 26B:
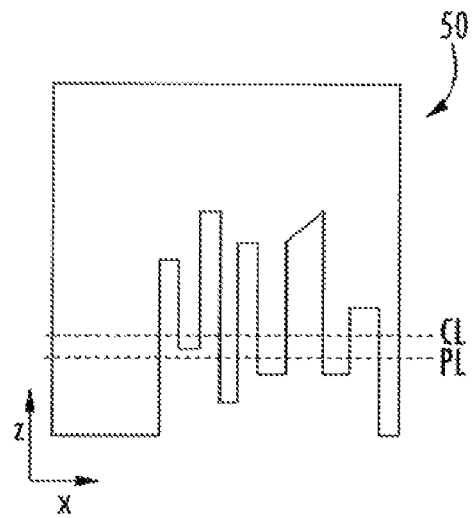
Figure 27:
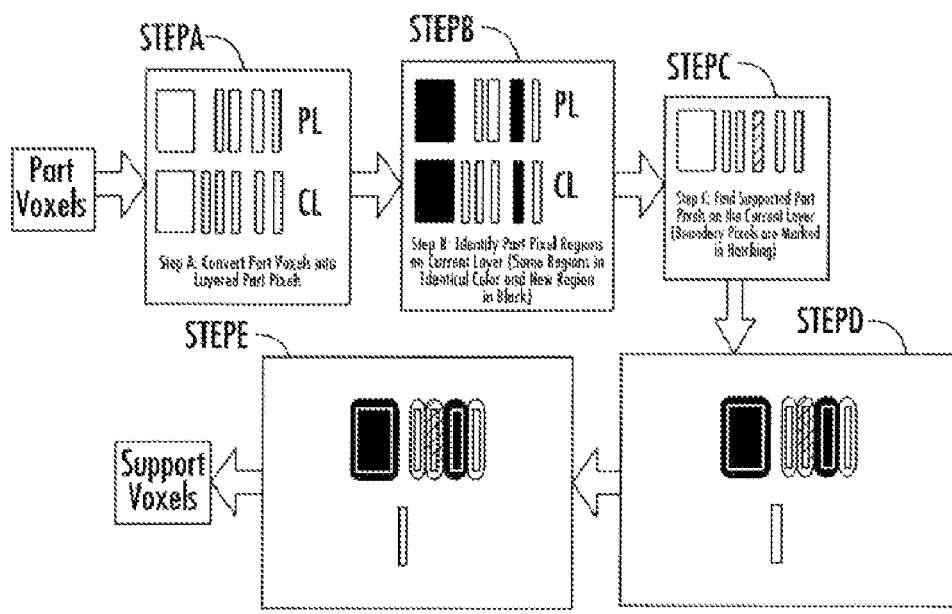
Figure 28:
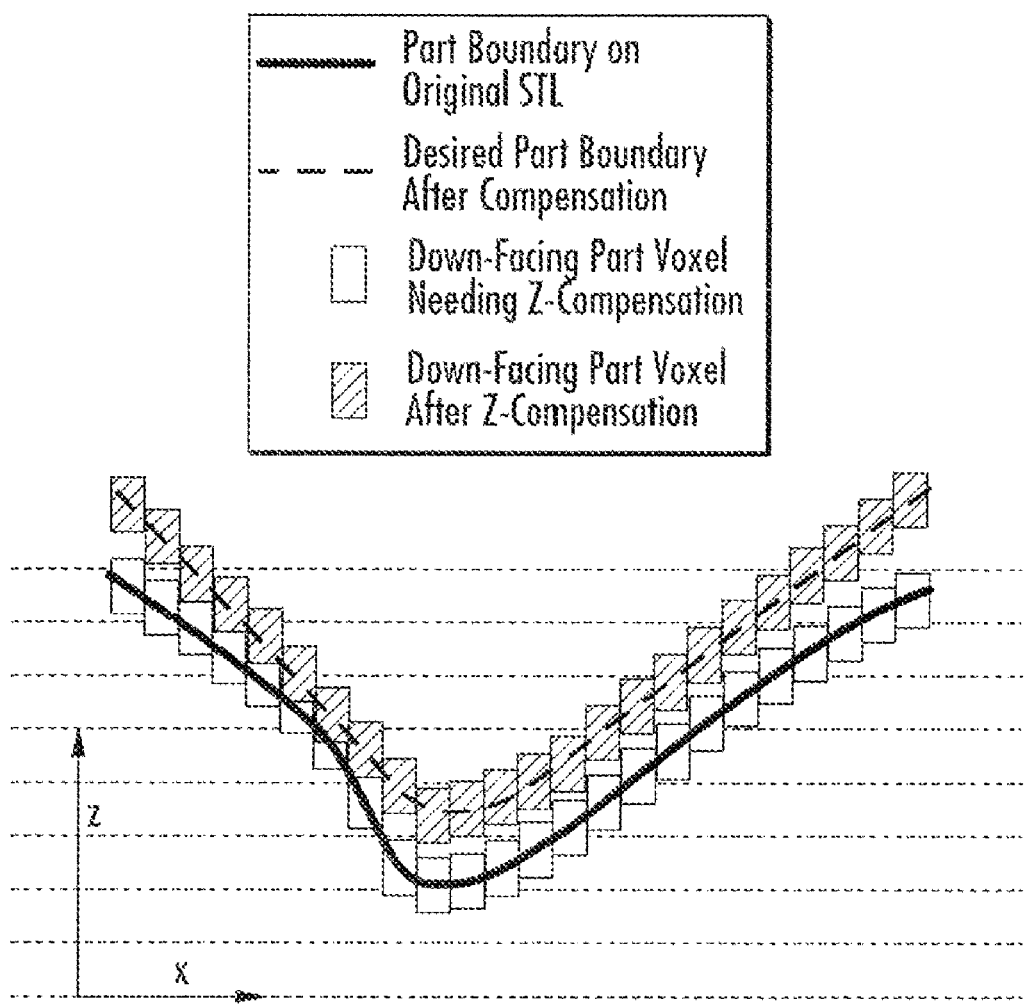
Figure 29:
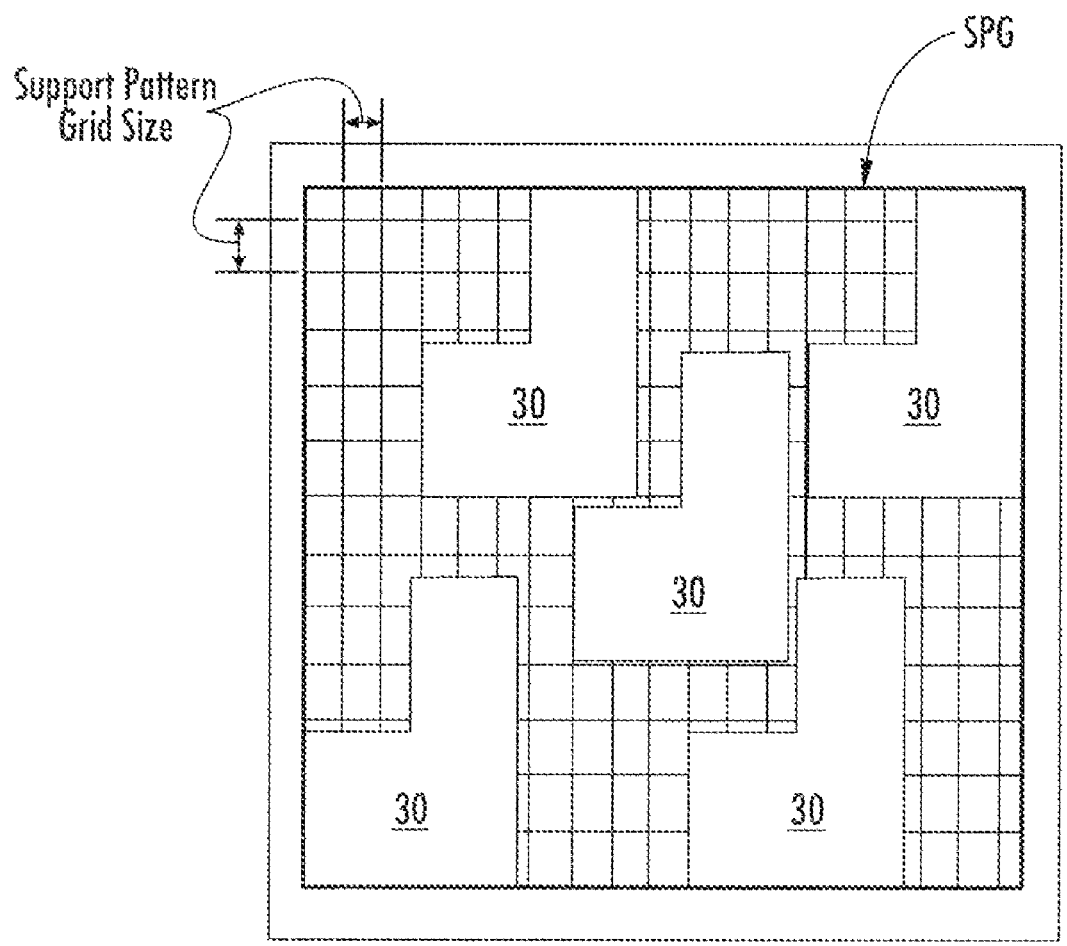
Figure 30:
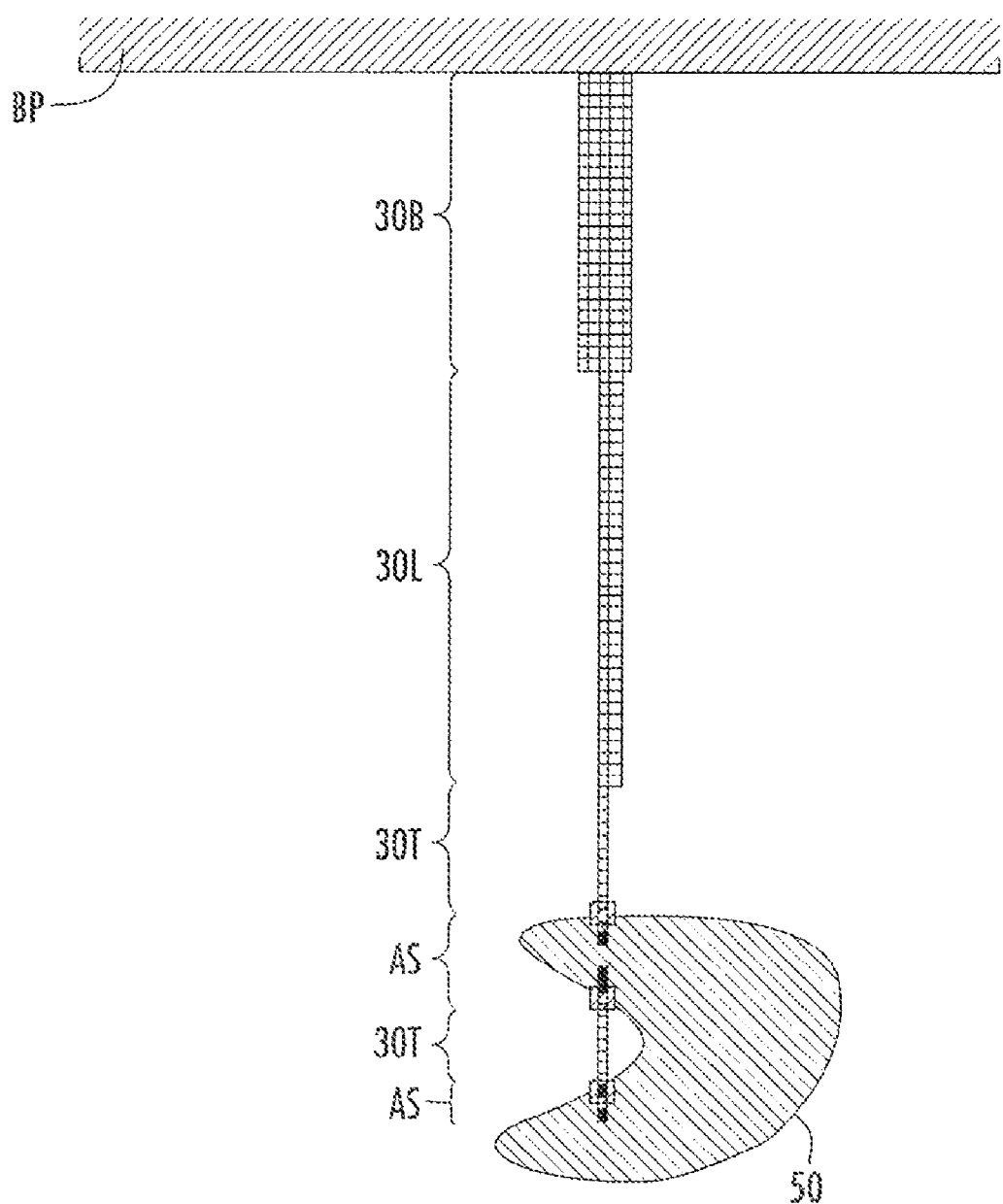
Figure 32:
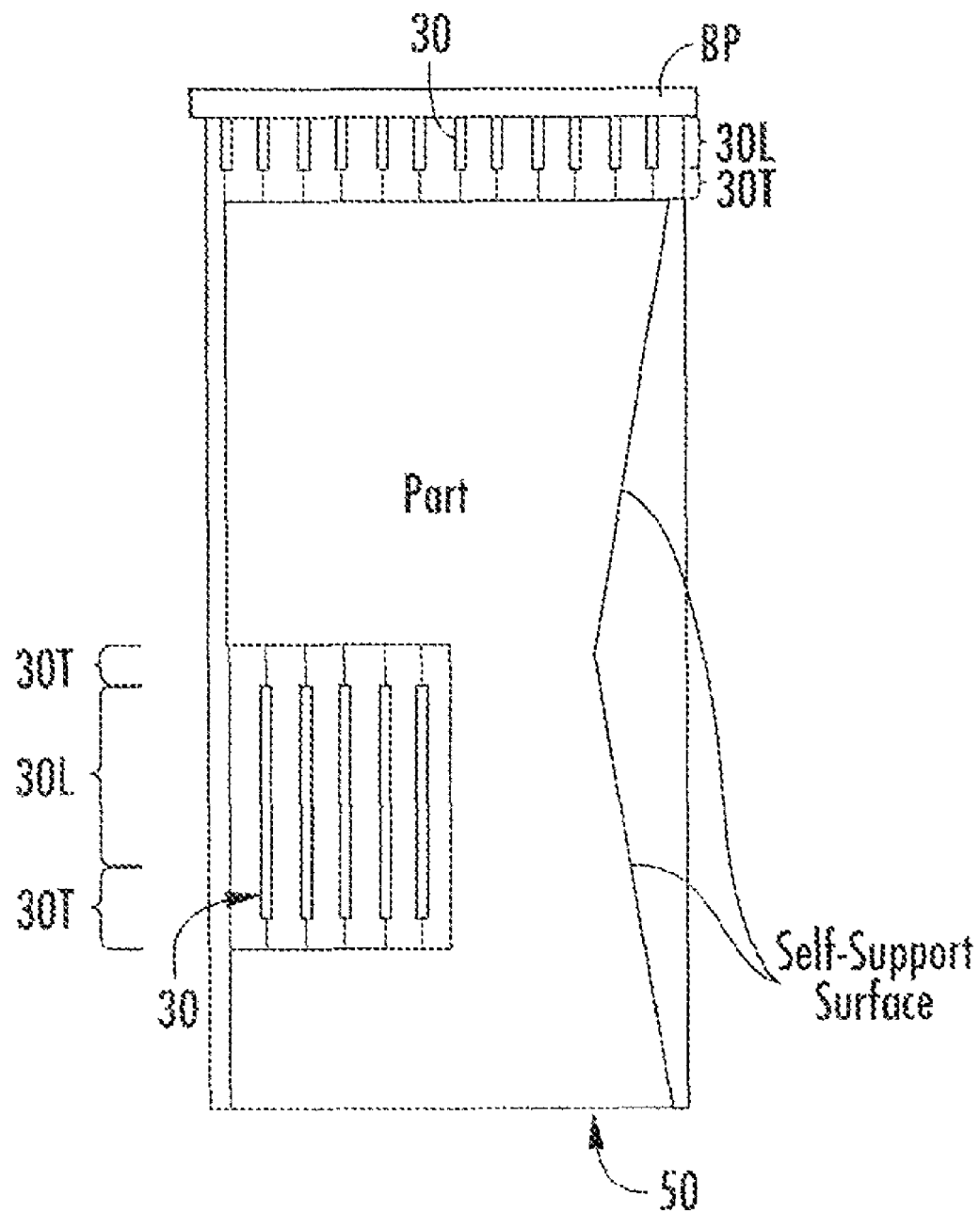
Figure 33:
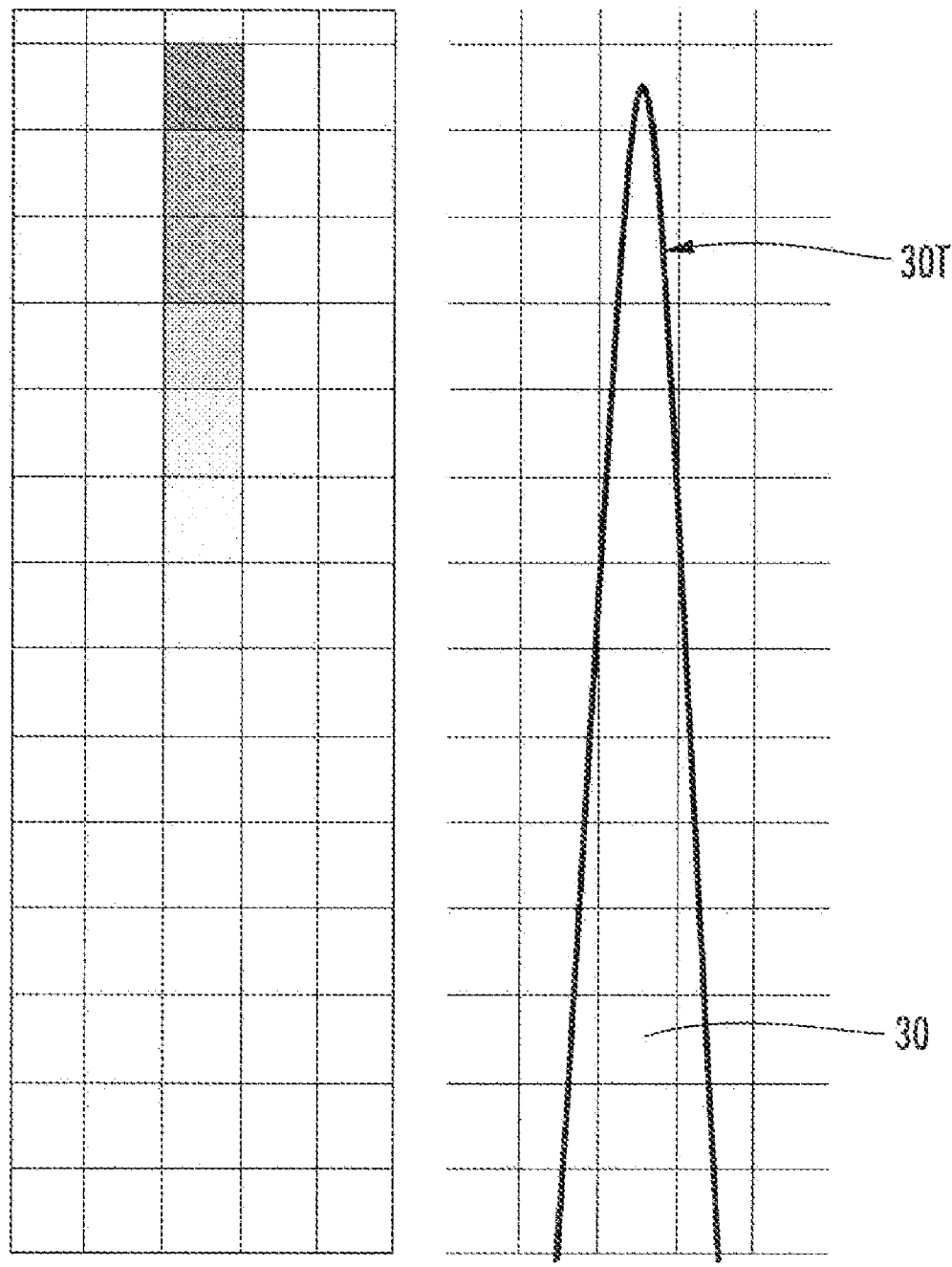
Figure 34:
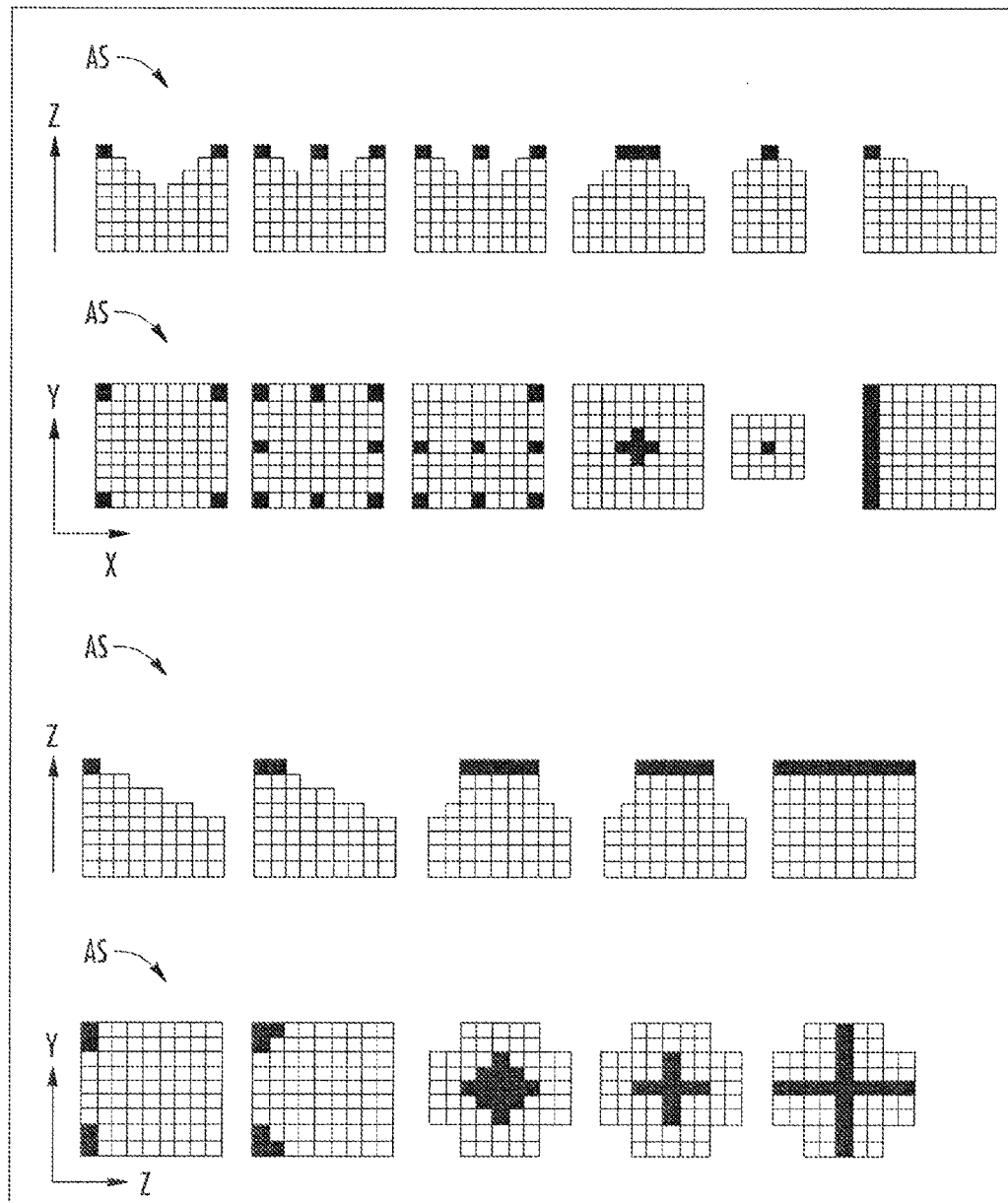
Figure 35:
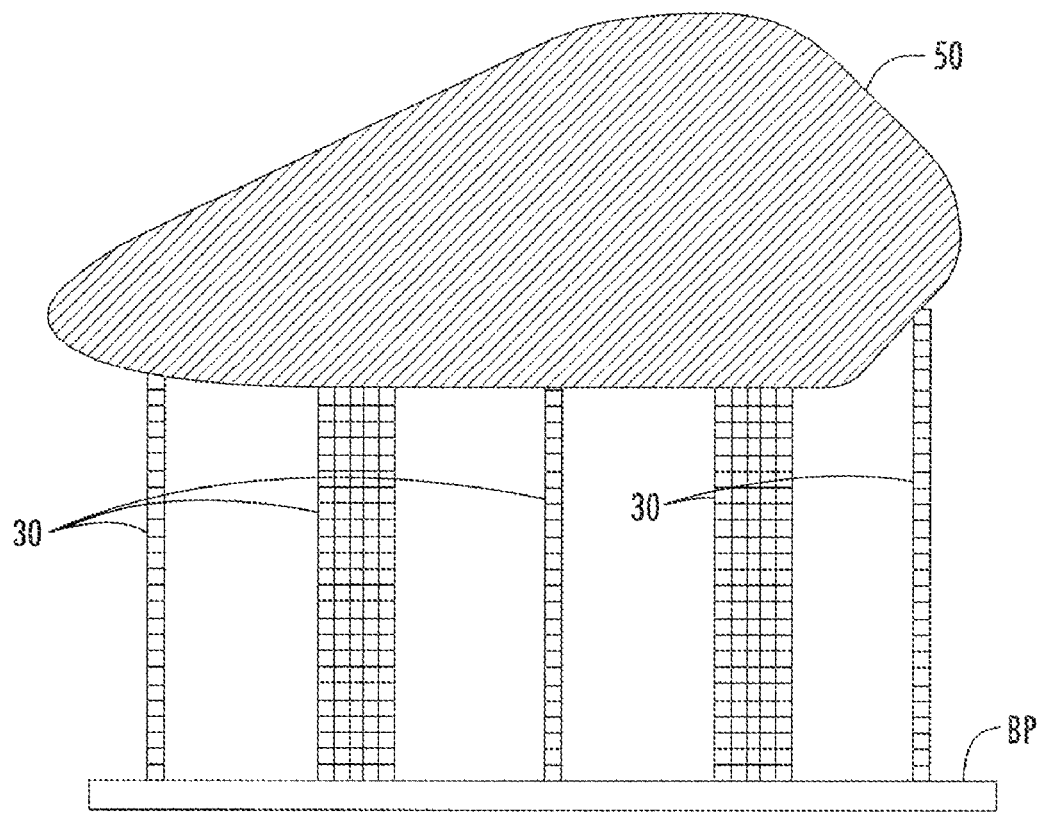
Figure 36:
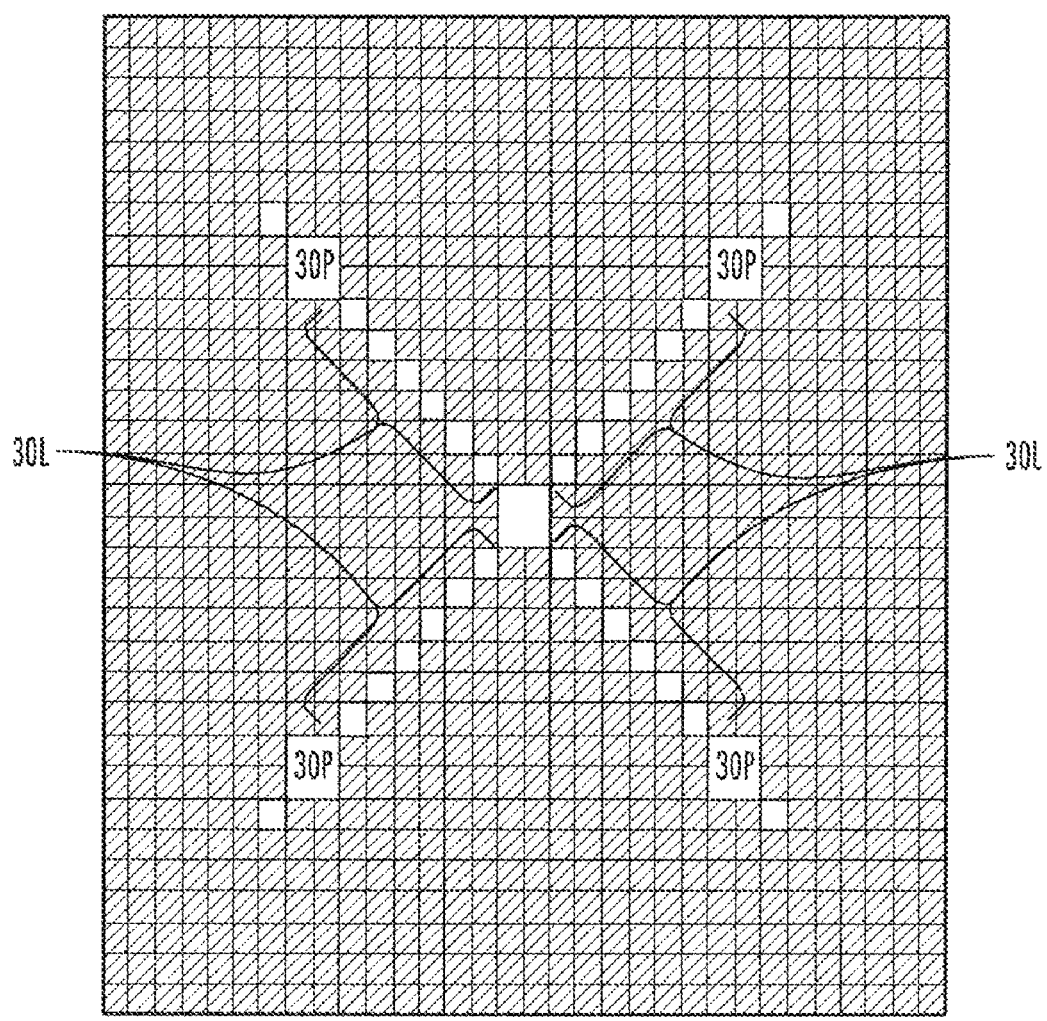
Figure 37:
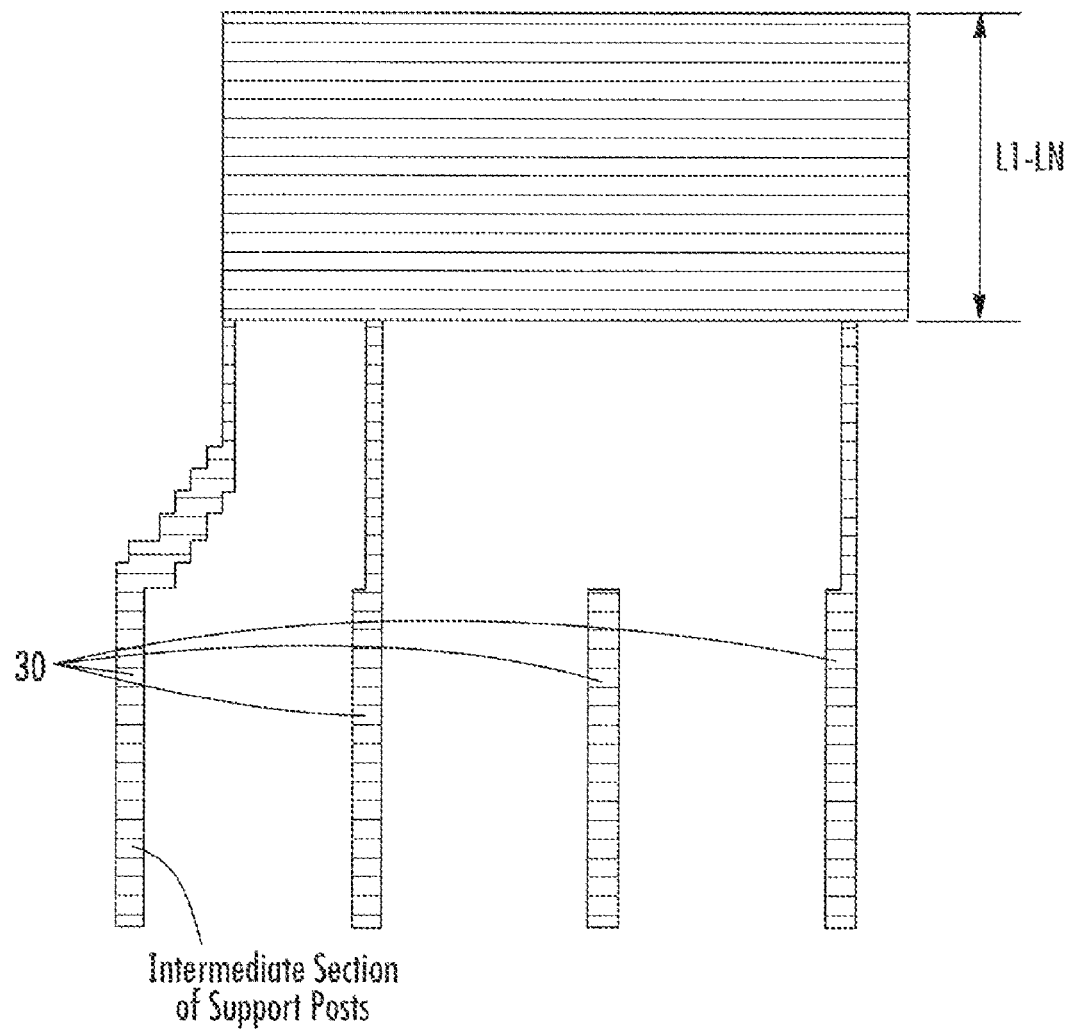
Figure 38:
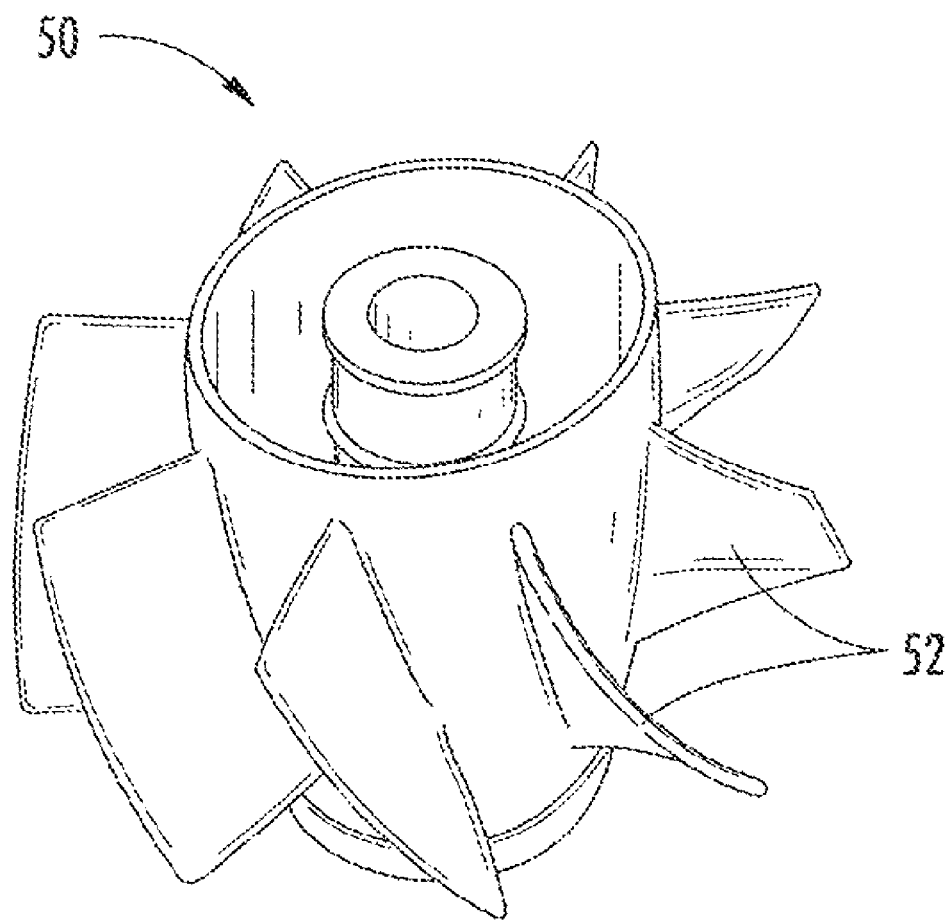
Figure 39:
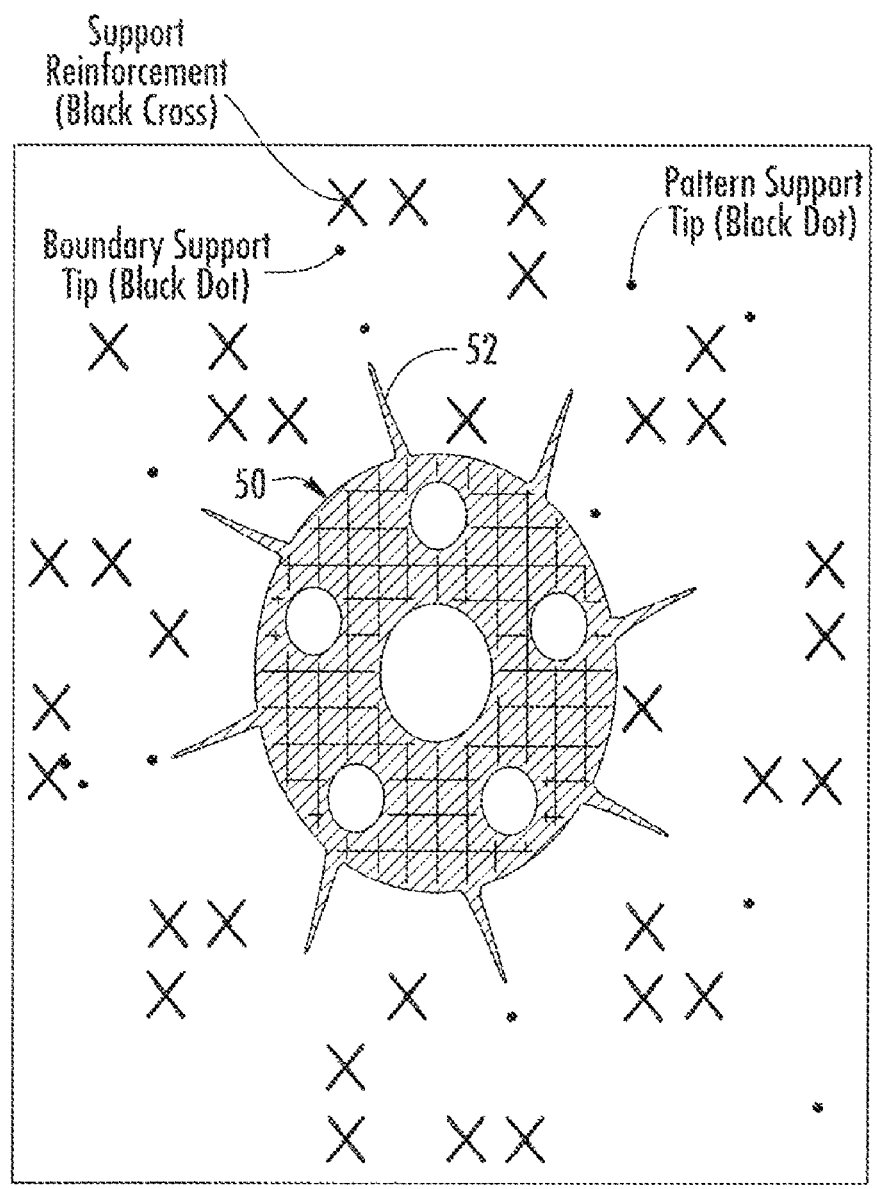
Figure 40:
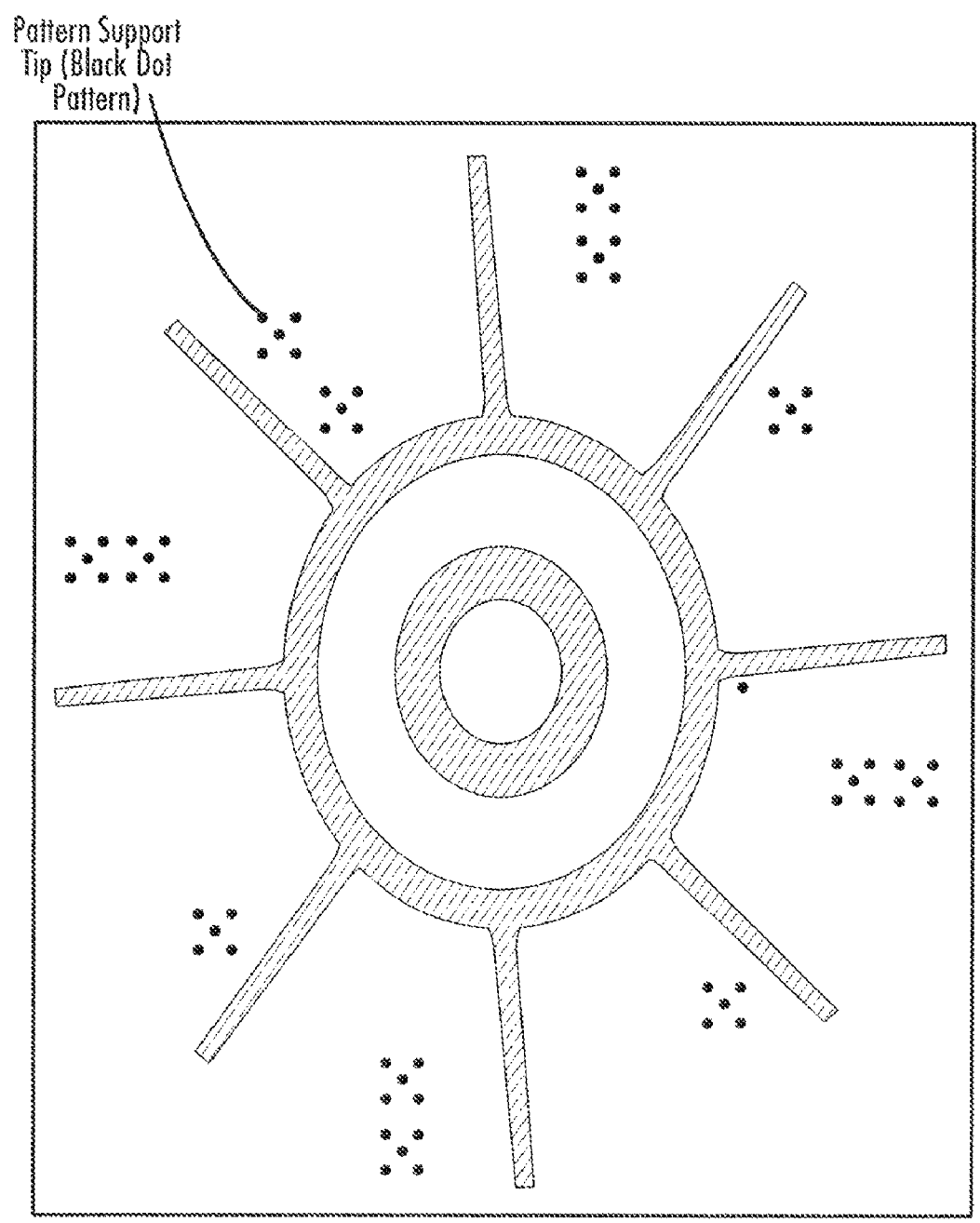
Figure 41:
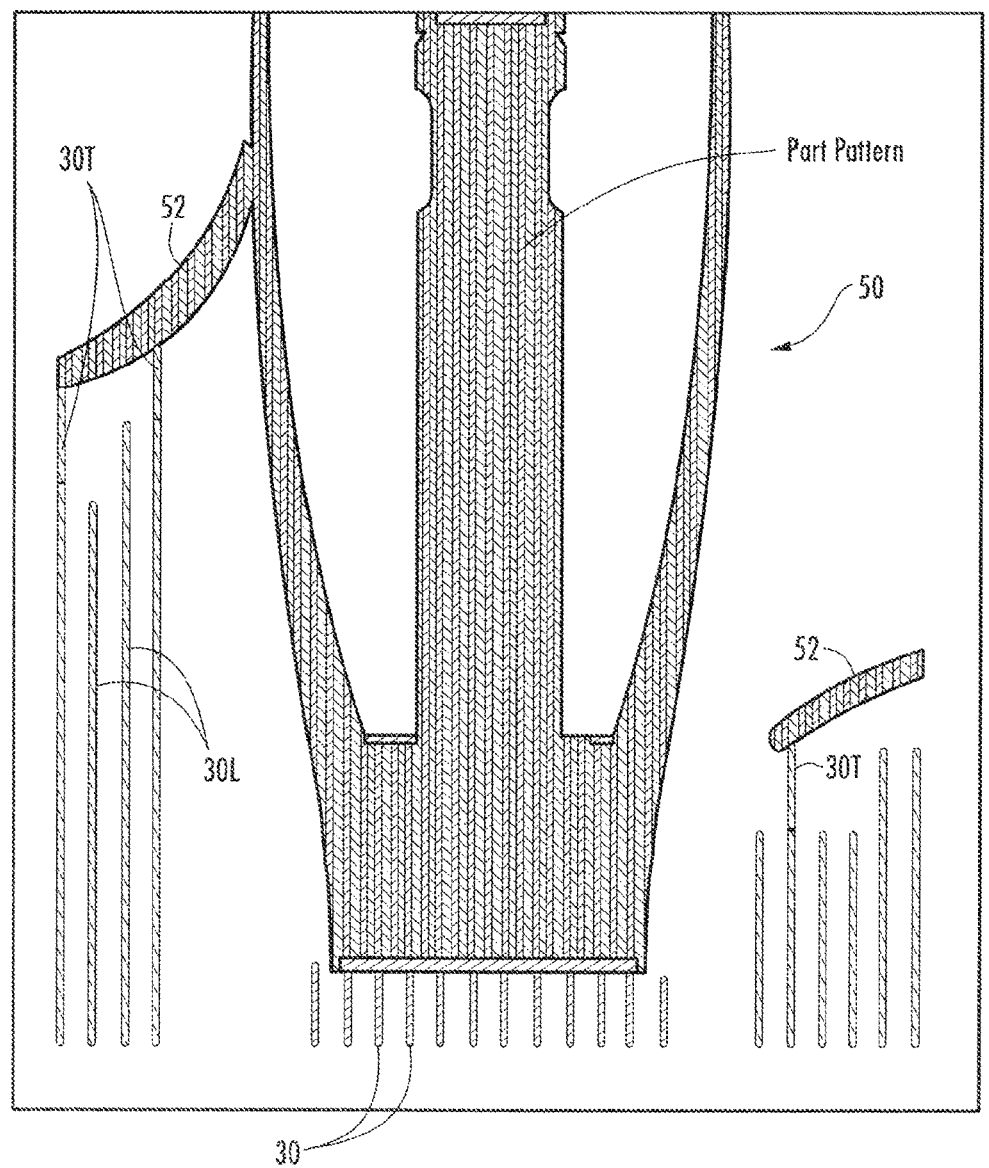
Figure 42:
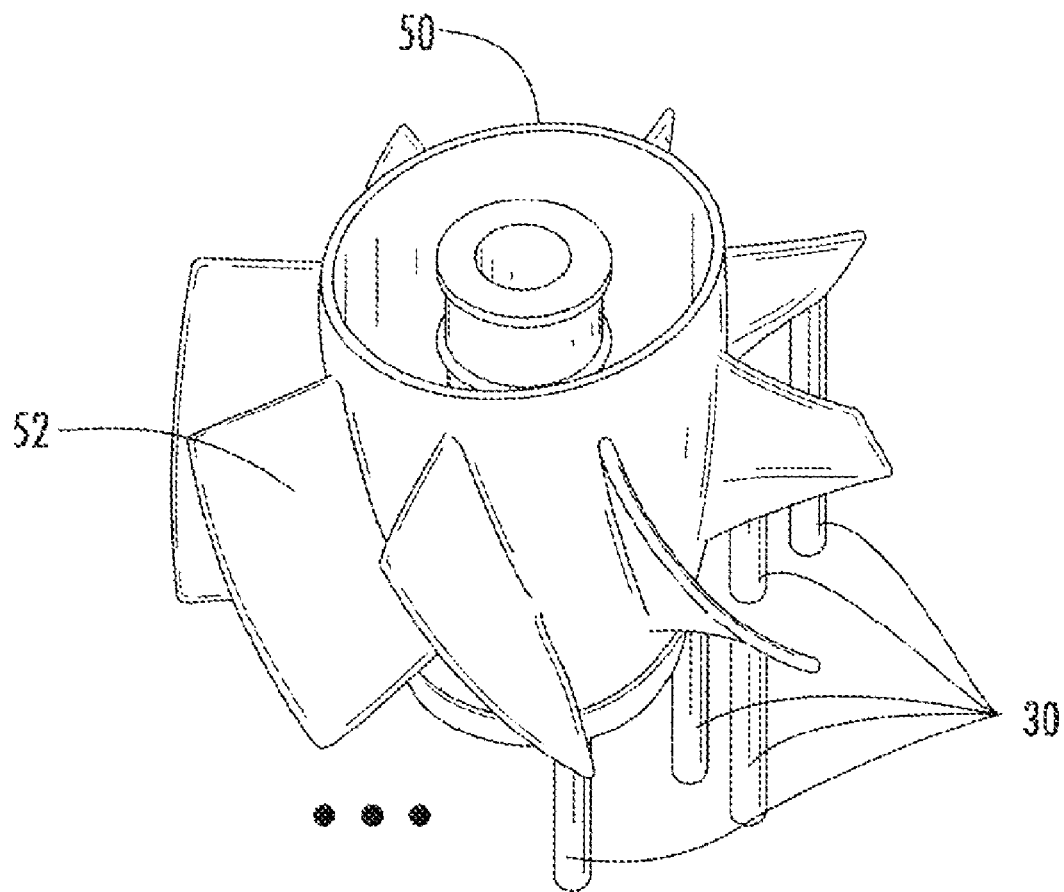

FIG. 21A shows an example schematic side view of an example part supported by a prior art support structure, illustrating a support structure with too few supports;

FIG. 21B is similar to FIG. 21A, except that the part is supported by too many supports;

FIG. 22 is a schematic diagram of an example part wherein the support is calculated in a manner according to the prior art that results in a mismatch between the support and the part;

FIG. 23 is a flowchart of an example method of creating supports that uses sliced data, voxels and pixels;

FIG. 24 is a schematic diagram of a part in the X-Z plane along with the build pad, illustrating the different types of voxels used to describe the part;

FIG. 25 is a schematic diagram similar to FIG. 24, illustrating the construction of support voxels at support anchors in the part;

FIG. 26A is a perspective view and FIG. 26B is a side view of an example part or "STL model", indicating in FIG. 26B a "current layer" and a "previous layer" that denote current and previously processed layers;

FIG. 27 is a pictorial flow diagram that illustrates an example method of constructing support voxels from part voxels;

FIG. 28 is a close-up view of a portion of a part that illustrates the step of applying a Z-compensation by moving down-facing voxels by a certain compensating distance to compensate for overcure;

FIG. 29 is a schematic diagram of a support grid pattern;

FIG. 30 is a schematic diagram of a part and a build pad showing an example of forming a support having a base section, a long section and a tip section, along with the corresponding support anchors represented by down-facing and up-facing support voxels;

FIG. 31A through FIG. 31D are cross-sectional views of various support patterns along the Z-direction for a grid of 32×32 pixels;

FIG. 32 is a cross-sectional view of an example part illustrating supports that vary in their geometry in the Z-direction;

FIG. 33 shows a gray scale of support tip pixels along with the resulting support tip shape that results in a sub-pixel support tip;

FIG. 34 is a schematic diagram of a set of multi-pixel support anchors;

FIG. 35 is a schematic diagram of an example part supported by large support posts to hold the part while smaller support tip posts support the "current" layer;

FIG. 36 is a schematic cross-sectional diagram of a typical reinforcement pattern between support posts in the long section of the support;

FIG. 37 is a schematic close-up diagram of a part being built, showing various configurations of the supports, including non-anchor support tips;

FIG. 38 is a perspective view of a part in the form of a fan having eight curved fan blades;

FIG. 39 is an X-Y cross-sectional view of the fan part showing a number of holes and the curved fan blades at layer #131 as well as the pattern of the supports;

FIG. 40 is similar to FIG. 39, but taken at layer #196;

FIG. 41 is a Y-Z cross-sectional view of the fan part of FIG. 38 along with the pattern of supports; and FIG. 42 is a perspective view showing the fan part as built, along with the various supports as determined using the methods of the present invention.

DETAILED DESCRIPTION OF THE INVENTION

The present invention is now described more fully with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the support generation methods of the invention are described and shown in the accompanying drawings with regard to specific types of parts made by film transfer imaging (FTI), it is envisioned that the functionality of the various apparatus and methods may be applied to any now known or hereafter devised SFF technique in which it is desired to add supports to the part being produced. Like numbers refer to like elements throughout.

One exemplary SFF system considered herein is an FTI system, such as the V-FLASH Desktop Modeler offered by 3D Systems, Inc. of Rock Hill, S.C., the assignee of the present application. Such FTI systems are described in one or more of U.S. Patent Application Publication Numbers; 2007/0259066; 2006/0249884; 2007/0296854; 2008/0206383; 2008/0169589; and 2008/0179786 which are assigned to the assignee of the present application, and the disclosures of which are incorporated by reference herein in their entirety.

The part-building supports of the present invention take into account the requirements from more traditional vat-based stereolithography as well as other requirements. The supports for each region of the part need to be built strong enough so that they will not fail as each layer is pulled away from the coating film or other surface of the image plane. Also, the supports as determined by the present invention are typically comprised of a few larger columns instead of many smaller columns, or many single pixel (point) supports. The approach of fewer selectively formed supports leads to fewer scars on the part so that the parts are easier to post-process; however, the scarring in some embodiments may initially be more significant when compared to fine point supports used in stereolithography or the like.

For purposes of this discussion, a "part" is an object or build created from a fresh resin layer provided on or near the image plane, with the image plane on the bottom and the build pad on the top. The part is generally pulled up and away from the image plane. For ease of illustration, some of the Figures show the build pad at the top of the Figure, while others show it at the bottom of the Figure.

Support Requirements

There are certain design and structural requirements that the supports must meet when being formed to support the part using the methods of the present invention. The first support requirement is that each local maximum must be attached to the build pad with supports (or to the part if the local maximum is at a lower layer of the part and it is shielded from the build pad by the part). Here, "local maximum" means a portion of the part that represents an island and is closest to the build pad relative to a surrounding portion of the part.

The portion of a part underlying a local maximum is described as a region. The portion of interest of each region is the size at its largest cross-section.

Another requirement is that the regions are determined such that the supports are adequate to support the part.

The present invention is directed to determining regions of the part requiring support structures and selecting the form of the support structure (i.e., sized, shape, relative location) so as to substantially minimize the number of support structures needed. While this may lead to larger surface abnormalities formed in the part than for prior art support methods, it is believed the trade-off of having fewer support structures outweighs the need for some additional post-processing.

Many areas of a part are self supporting. Any layer built completely on top of another layer is self supporting, but in addition the new layer can extend sideways substantially beyond the old layer and the old layer will still support it. For any given resin (or build material) type and set of build conditions, the extent of the ability of a layer to be self-supporting can be determined. This typically can be from 10 to 50 or more pixels. Parts with steep walk tend to be completely self supporting. Parts with shallower walls will need to have additional supports along the wall, depending on the resin type and the build conditions. Flat areas require supports spaced over the entire flat area. As additional supports are employed, their strength is added when calculating whether the supports are strong enough not to break as the part is pulled away from the largest cross-section of each region and sub-region.

The strength (load) requirement to pull parts away from the coater film (or image plane) can be substantial, and green supports tend not to be sufficiently strong. In some cases, the breaking force required for a large cross-section support can exceed 50 pounds (222 N), while the breaking strength of a typical 4×4 pixel support is around 6 pounds (27 N). As mentioned above, it is usually desirable to have a minimum number of scars on a part to reduce the amount of post-processing, even if the fewer scars are larger. In other embodiments that use the most advance SFF systems, the load requirement is a few pounds. Regardless of the load requirements to pull parts away from the coater, the supports need to be sufficiently strong and the number of supports should be minimized.

Since the strength of a support increases as its cross-sectional area is increased, it is desirable to have just a few supports with relatively large cross-sections, and it is most desirable to have the minimum number of supports required. A rule of thumb has been established that the combined cross-sections of the supports should sum to 2% of the largest cross-section of each region and sub-region. This rule of thumb can be reduced to 1% in certain cases that utilize the most modern SFF systems.

As mentioned, it is generally better to achieve "rule of thumb" support with fewer large cross-section supports than with more smaller-cross-sectional supports to minimize the number of scars. The 2% rule of thumb is based on the current 114 W resin, with the layer exposed 50 mJ/cm$^2$ and with the supports exposed for 71 mJ/cm$^2$. Thus, the rule of thumb will vary for different resins that have different green strengths and with different method exposures. In an example embodiment of the present invention, the rule of thumb used is based on a 1% value.

Example Embodiments

Example embodiments of the support generation method of the present invention for generating support structures are now described.

FIG. 1 is a schematic diagram of two objects—namely, a teapot base 10 and a showerhead 20—as presented using "Print Preview" Software graphics and shown residing on a build pad BP. Although a disposable build pad BP with raised surface features is disclosed herein, it should be appreciated that any build platform or other surface adapted to support the build or part, regardless of the size, shape, surface texture, reuseability, or other parameters of the build pad, may be used in conjunction with the present invention. It should also be appreciated that parts of various sizes and shapes may be created and supported using the present invention. Turning again to FIG. 1, larger columnar support structures ("supports") 30 are indicated as squares and smaller supports are indicated by circles. The teapot base 10 has an outer ring region 12 supported by sixteen 4×4 supports 30, and an inner ring region 14 supported by two 16×16 pixel supports, and fourteen 8×8 pixel supports. The total support cross-section of the teapot base 10 is 1664 pixels, so that by the 2% rule of thumb it can support a build with a largest-part cross-section of 83,200 pixels. The largest-part cross section of the teapot base 10 is ~91,459 pixels (slightly larger than the 2% rule of thumb), and the teapot base has been successfully built using the support structure configuration shown without breaking the supports on a FTI system.

FIG. 2 is a perspective view of the built teapot base 10 and shower head 20 on the FTI system build pad BP. The shower head 20 has relative small cross-sections on every layer and is consequently supported with smaller column supports 30 as indicated in FIG. 1. It is noted here that the pixel dimension on the FTI system used to make the parts is 0.0088 inch (0.0223 cm).

The present invention provides numerous advantages to users of the SFF system compared to prior art supports. Some of these advantages include, but are not limited to: 1) the part is assured to be built without the supports breaking; 2) the number of scars is minimized for easy post-processing; 3) there is no build-time penalty for forming the fewer number of supports (the exposure time equals the layer exposure time plus the border exposure time); and 4) less resin is used for the supports than in prior art support configurations, which translates into a lower operating cost for the SFF system being used to build the part.

The following description provides a number of example methods of formulating different regions using pixel layer data generated for a FTI system. These regions are then used for the support generation method. It should be appreciated that the actual support generation method may be performed by any present or future method for generating supports, including, but not limited to the methods described in the above mentioned patents incorporated by reference.

Support Generation Method

The support generation methods of the present invention are based upon the following assumptions: 1) A single region that requires support can span across multiple layers; 2) a single layer can have multiple regions that require support; 3) vertical scarring of parts due to the supports needs to be minimized; 4) support regions should include outer edges and corners of a part so as to prevent delimitation of layers; and 5) the support regions created should account for steep regions that are self-supporting, i.e., self-supporting steep portions of the part should be identified and eliminated from the support regions.

These assumptions are provided to disclose the best mode of the invention and are not intended to narrow or limit the scope of any claims. Further embodiments of the present invention include additional, alternative, and/or fewer assumptions in the analysis. Furthermore, it should be appreciated that all the steps in the following section are described assuming that the part is hanging from the build pad such as in an FTI method so that upward facing surfaces need to be supported.

I. Method of Identifying Part Regions

The first main aspect of the support generation method is to independently identify part regions ("support regions" or just "regions") in at least one layer, and preferably each layer, in the part building method that require support. This involves analyzing the layers independently using seven steps (steps 1 to 7, below) to generate regions R for each layer. During the first six steps, the formation of each region R is restricted to a single layer. The seven steps of the method are discussed with reference to FIG. 3 through FIG. 7.

FIG. 3 is a schematic X-Z diagram of an example part 50 to be built. Part 50 is broken down into a number of basic part components ("pixels") P and layers L (L1, L2, . . . L3). Step 1 includes identifying all the pixels P that are open to air and that face upward. This entire set of pixels, which are shaded in light gray and identified as pixel set PP in FIG. 3, is referred to as "PROBABLES." This is the total set of pixels P that will be analyzed and can be part of a region R. The pixels P that are not part of this set PP cannot be part of any region. On the other hand, pixels in pixel set PP have a chance (i.e., a probability) of being considered as part of a region R.

In step 2, one starts with the layer L1 and the lower-left pixel that belongs to PROBABLES pixel set PP. This pixel is identified as pixel P1 and is used as the starting point to identify regions. FIG. 4 is a schematic diagram of the topmost layer of a part 50 to be built. It is noted here that any useful notation can be used for pixel identification, such as P(X,Y,Z), where X,Y,Z are Cartesian coordinates that represent the center-point coordinates of the particular pixel. At this point, pixel P1 is identified ("tagged") as "region 1" or R1, as shown in FIG. 4.

In step 3, all the pixels P that belong to the PROBABLES pixel set PP and that neighbor the pixel P1 identified in step 2 are identified and included in Region R1. FIG. 5 is similar to FIG. 4 and illustrates the additional pixels P2, P3 and P4 added to region R1, so that region R1 now includes a total of four pixels P1 through P4 ("P1-P4").

In step 4, all of the neighboring pixels of the pixels P1-P4 presently in Region R1 are identified. FIG. 6 is similar to FIG. 5 and shows pixels P5 through P10 as the neighboring pixels. If any of these newly identified pixels P5 through P10 belong to the set "PROBABLES" PP, then they are also included in region R1.

Step 5 repeats step 4 and grows region R1 until none of the neighboring pixels P of region R1 belong to the set PROBABLES PP. At this point region R1 has been completely identified, as illustrated in FIG. 7.

It is noted here that some regions R will only have outer boundaries, while some will have inner and outer boundaries. Examples of these two cases are presented in the schematic diagrams of FIG. 8 and FIG. 9, respectively. For each region R, the outer-boundary pixels PO and the inner-boundary pixels PI are tagged separately.

Step 6 includes determining if there are any other "PROBABLES" PP left on layer L1 that are not part of region R1. If so, among the remaining "PROBABLES" pixels in layer R1, start with the lower-left pixel and repeat the method used to determine the next region R2. This method is repeated until all the PROBABLES on layer L1 have been exhausted.

Step 7 involves repeating steps 1 through 6 for each layer L that makes up part 50 in order to identify all of the regions R.

II. Identify/Eliminate Self-Supporting Pixels in Each Regions

The second main aspect of the support generation method involves eliminating any self-supporting pixels P in each region R. This will also eliminate from each region R those pixels P where if supports 30 are created, they will cause scarring on neighboring vertical walls.

Step 8 includes considering the pixels P that are on the outer boundary of the region R to determine if any of these pixels have immediate neighboring pixels that are not part of region. If so, those outer boundary pixels P are marked as "self-supporting pixels" PS and only the pixels P that have the neighboring pixels by a width of 1 pixel P are inset.

FIG. 10 and FIG. 11 are schematic diagrams of an example layer L of an object 50 illustrating this method. The direction of inset is 180 degrees opposite from the self-supporting pixels PS. FIG. 12 is a perspective view of an object 50 that illustrates a self-supporting area SSA determined after the above insetting method.

Note that in this example, the outer boundary adjacent the self-supporting pixels PS was pushed inside by "one pixel width." In further embodiments the outer boundary can be pushed in by a distance of 2 or 3 pixel widths. The exact self-supporting distance is determined empirically in accordance with further embodiments of the present invention.

If region R is very thin (e.g., such as 3 pixels wide), and one edge is self-supporting, then the outer edge of the region R is preferably not purged because it needs to be supported to prevent delamination.

If the entire region R comprises just a few pixels P (e.g., 4 to 5), then it can be identified as "a small feature" can be designated to be supported by a single support 30.

Step 8 is carried out region by region until all of the regions R have been considered.

III. Identify/Eliminate Self-Supporting "Steep" Areas

The third main aspect of the support generation method involves identifying and eliminating any self-supporting steep areas from the identified regions R. This serves to minimize the number of supports 30 by not supporting those regions that do not need support.

What constitutes a "steep" area depends on a number of factors, including the type of material used and the particular build method parameters involved in forming part 50. In an example embodiment, a "self-supporting angle" is empirically determined for the particular type of build method used.

In certain cases, only a section of a single region R is self-supporting, while the other sections of the region need supports. Step 9 of the method thus involves performing an analysis that seeks to identify those sections within a region that need support, including eliminating entire regions if they are deemed self-supporting.

For the ease of discussion, consider the region R presented in the schematic diagram of the select layer L as shown in FIG. 13, which is an X-Y view of the region R of interest. FIG. 14 is the Z-view (i.e., the view in the X-Z plane) of the same region. The steep sections $R_{ST}$ of region R are sufficiently steep so that they are deemed self-supporting, so that the pixels P associated therewith should be eliminated from the region R once the analysis is complete. Note the "non-steep" section $R_{NS}$ formed by the flat top portion of part 50.

One example approach to identifying steep region sections $R_{ST}$ within a region R is as follows. First, start with the top-most region R (i.e., the region closest to build pad BPS) then independently consider each row of X-pixels P for the given region R. For the part illustrated in FIGS. 13 and 14, consider a row of pixels P located in the middle of the region R.

With continuing reference to FIGS. 13 and 14, start with pixel P1 and find the Z-height difference ΔZ between pixel P1 and P2. If this difference is greater than the thickness of two layers L, tag pixel P1 as "STEEP-X." If it is less than three layers, tag pixel P1 as "SHALLOW-X."

Then move to pixel P2. Perform the same analysis using pixels P2 and P3 and tag pixel P2 accordingly. The last pixel (P7 in the present example) gets the same tag as the second-to-last pixel, which in the present example is pixel P6.

Once all X-rows are complete, perform the same analysis for the same pixels in the Y-direction and tag them appropriately as "STEEP-Y" and "SHALLOW-Y."

In the above example, the pixels are X-tagged and Y-tagged as set forth in the following Table 1:

TABLE 1

| X, Y Pixel Tags for Steepness | | | |
|---|---|---|---|
| X-Pixel | TAG | Y-Pixel | TAG |
| P1 | STEEP-X | P8 | STEEP-Y |
| P2 | STEEP-X | P9 | STEEP-Y |
| P3 | SHALLOW-X | P10 | STEEP-Y |
| /////// | ////////// | P11 | SHALLOW-Y |
| P4 | SHALLOW-X | P4 | SHALLOW-Y |
| P5 | SHALLOW-X | P12 | SHALLOW-Y |
| P6 | STEEP-X | P13 | STEEP-Y |
| P7 | STEEP-X | P14 | STEEP-Y |
| /////// | ////////// | P15 | STEEP-Y |

At the end of this tagging method, each pixel P will have an X- and a Y-direction tag. If either of these direction tags is "STEEP," the particular pixel P is excluded from the newly formed region R as being self-supporting. All pixels P that have a SHALLOW-X and a SHALLOW-Y tag are included in the region R because they require support.

In the example of FIG. 13 and FIG. 14, the section of region R that is deemed "shallow" and non-self-supporting is defined by pixels P3, P4, P5, P11 and P12 and represents the flat top of the wedge. Thus, the updated region R includes these pixels P. This analysis would also be valid if the wedge was in a reverse orientation (i.e., an indentation as opposed to a protrusion).

In some cases, all the pixels P of a region will be tagged "STEEP" in either direction and hence will be eliminated completely from region R because they are self-supporting.

If there are multiple closed boundaries in a single region R, they are separately analyzed using step 9.

IV. Merging Multiple Regions into Common Regions

The fourth main aspect of the support generation method involves merging the different regions R from different layers L into a single (common) region R if the different regions are in close proximity.

FIG. 15 is a Z-view schematic diagram of an example part 50 relative to build pad BP. With reference to FIG. 15, step 10 includes starting with a first boundary B1 on the first (upper-most) layer L1. Boundary B1 includes edges E1.

Next, all boundaries 82 on layer L2 below are examined to determine if any of these boundaries share a common edge E2 with the first boundary 81 of the top layer L1. If they do, the two boundaries B1 and B2 are merged into one region even if the Z-height is different. Note that two boundaries B on the same layer should not be considered for merging and should stay separate.

Next, the third layer L3 is checked to see if there are any boundaries 83 that share a common edge E3 with the two merged boundaries B1 and B2 on the top. If so, this boundary is added to the top two boundaries to grow the region R.

This method is repeated to keep adding new boundaries B to this growing region R until a layer L is reached where there is no boundary that shares a common edge with the region being formed. At this point, the region R is completely generated.

Once this region R is created, the next step is to record the minimum Z-height and maximum Z-height for the region. This information is used in another part of the support generation method as discussed in greater detail below.

This method is then repeated by starting with the top-most boundary that has yet to be considered as the starting point for the analysis.

V. Tracking and Sorting the Various Regions

The fifth main aspect of the support generation method involves tracking and sorting the various regions R that have been created. Thus, once all the regions R have been generated, step 11 involves determining the following information pertaining to each individual region (not necessarily in the order presented).

First, the local maximum and centroid is determined for each region R using standard algorithms known to those skilled in the art. Note that the local maximum MA can comprise several pixels clustered together and does not necessarily have to be one pixel. The standard algorithm used should be adjusted to address this scenario.

Second, the X-Y projected area of each region R is determined (as opposed to the surface area as measured in the X-Y plane), and the regions sorted in order by decreasing area. Those regions R constituted by less than a certain number of pixels P (such as ten pixels) are denoted as "point regions."

Third, the "Z-min" and "Z-max" values of reach region R are determined, wherein Z-min indicates the Z-position of the region. This is illustrated in the schematic diagram of FIG. 16.

Generating the Supports

Once the above steps are carried out to identify all of the regions R associated with part 50, the supports 30 need to be generated for the various regions R. This involves a number of main steps, which are discussed below.

Each region R or local maximum MA supports an independent volume of mass (referred to hereinafter as an "island" I) before it merges with another island under another region and/or the bulk of the part. Thus, the first main step involves determining the independent volume and the largest cross-section under each region R or local maximum MA.

The goal is to identify the size of the island I under each region R and also the largest cross-section within that island. For the sake of discussion, consider the following example as illustrated in the schematic diagram of FIG. 17 that shows the various layers L of an example part 50. Part 50 includes three towers 50T1, 50T2, 50T3, and a bridge 50B.

To begin the analysis, consider the first layer L1 of the entire build file. Select all the local maxima MA that have already been identified on this layer as MA1, MA2 and MA3. These local maxima represent the peaks of the three islands I (I1, I2 and I3, respectively) in the build file. These islands correspond to the three towers. The analysis begins using these three local maxima.

The next step in the analysis involves moving to layer L2 and determining the pixels P that are exactly under the pixels that define the local maxima MA on the previous layer. These are pixels Px, Py and Pz respectively.

The next step in the analysis involves determining if there is any overlap among the Px, Py and Pz pixels. In this case, there is no such overlap, so that the analysis proceeds to the next layer L3.

At layer L3, the pixels under Px do not overlap any pixels under islands I2 and I3. Also, pixels P under island I2 are denoted by Pa. Likewise, the pixels P under I3 are denoted Pc. Also, pixels P making up bridge 50B are denoted by Pa, Pb and Pc.

To identify the pixels of bridge 50B in layer L3, the pixels Pb that define bridge 50B as the local maximum MA4 are found. Then grow outwardly from pixels Pb in all directions until the edge of part 50 is reached. This identifies pixels Pa and pixels Pc.

Now, pixels P under islands I2 and I3 overlap pixels under bridge 50B. Also, local maxima M2 and M3 are higher than local maximum M4. Hence, at this point, islands I2 and I3 are completely identified.

This method is continued for islands I1 and I4 until layer L14 is reached. At layer L15, the pixels of islands I1 and I4 overlap, which allows one to draw the conclusion that islands I1 and I4 are completely identified.

The method is further continued to identify the largest island I5, which is under local maxima MA5, MA6, and MA7, as shown in FIG. 18.

While the above analysis is being performed, the largest cross-section (i.e., the one with the most "ON" pixels) under each of the respective islands is progressively updated and the largest cross-section is stored in the respective region/island data-structure. Here, an "ON" pixel constitutes a pixel P that makes up the body of part 50, as opposed to an "OFF" pixel that constitutes a space or void within the part.

The next main step involves determining the cross-section CS that has the largest number of "ON" pixels. As layers L are being generated, this step involves sum-up all the "ON" pixels for each layer and determine the layer with the most "ON" pixels. This is the largest cross-section on part 50 that needs to be supported. All the layer information and pixel information of this layer is preferably stored in a separate data-structure so that it can be used during support generation. This step is performed during slicing.

Conceptually, at this point, all the regions R, islands I, the largest cross section CS under each island I, and the largest cross-section for the entire build have been identified. Hence, a typical part is mathematically tagged as shown in the schematic diagram of FIG. 18.

The next main step involves generating the local maxima MA and centroid supports 30. This involves considering each island I independently and starting with the one that is closest to the build pad BP. The total number of support-pixels P required to adequately support this island I is equivalent to either 2% of total "ON" pixels P on the largest cross-section CS within the island, or to 1%, depending on the system used, as will be appreciated by one skilled in the art.

With reference to FIG. 18, in island I1, if the cross-section CS indicated by the dotted line through the island has 1,000 ON pixels P, the supports 30 that are created to support island I1 should have at least 20 pixels. The maximum size of support 30 that should be created to ensure optimal support and minimal damage to the surface of part 50 is 16×16 pixels. In the case of island I1, one support 30 in the center of the local maximum MA1 is employed. The size of this support 30 is calculated as follows.

If the total number NP of pixels P for support 30 is greater that 256 (i.e. 16×16), then the size of this support is $(NP)^{1/2} \times (NP)^{1/2}$, or in the present example, 16×16 pixels. If NP is less that 256, then calculate the square-root of the total pixels P required. In this case, 20 pixels P are required, so that $(NP)^{1/2} = 4.47$. Then for the X-dimension, round the number to the closest higher integer and for the Y-dimension round the number to the closest lower integer. (In this case X-dimension is 5 pixels and the Y-dimension will be 4 pixels. This ensures that the size of the support will always be greater than the absolute minimum required.

In an example embodiment, there is an additional check that is performed to determine whether a support is required at the centroid of the cross-section. This additional check includes determining the X-Y distance $D_{CS}$ of the centroid of the largest cross-section CS from the center of the support created to support the local maximum MA. If this distance $D_{CS}$ is greater than about 100 pixels, then another support 30 is created that has the same X-Y dimensions as that of the local maximum support and that is located at the centroid.

At this point, the local maximum MA and centroid supports 30 have been created. The next main step involves creating surface supports 30 on islands I if either of the following two conditions has not been satisfied. The first condition is that the total support pixels P (local maximum supports+centroid supports) are less than the 2% (or 1% or the like) support pixels required for the given island I. The second condition is that there are large spans on the island/region that should be supported even if the above condition has been satisfied.

The first step is to determine the number of locations NL that need surface supports 30. FIG. 19 is an example of a largest cross-section CS of layer L to be supported by supports 30. With the centroid C as the focal point, map a grid with an X-pitch of 60 pixels and Y-pitch of 120 pixels. If any of these grid points land on the actual cross-section and do not overlap with the local maximum support, they are considered to be candidate locations for the surface supports. This is illustrated in FIG. 20.

The next step involves determining the size of surface supports 30. If the first condition above (i.e., 2% support pixel) is yet to be satisfied, then the number of pixels that are still required needs to be determined. The total number NS of surface support pixels NS required is calculated as follows:

$$NS=NT-(NM+NC),$$

where NT is the total number of support pixels required, NM is the number of local maxima support pixels required, and NC is the number of centroid pixels required.

The number NS of surface support pixels P is distributed evenly among all the surface supports 30 that need to be generated. The exact size of each surface support 30 is determined in the same manner as for the local maxima supports. A single surface support 30 should not be less than 4×4 pixels, nor should it be more than 16×16 pixels. Hence, if any of the surface supports is less than 4×4 pixels, the size should be increased to at least 4×4 pixels. Once the sizes of surface supports 30 are determined, the surface supports are generated.

The steps of generating the local maxima and centroid supports and generating the surface supports are repeated for all the different islands that were identified to generate adequate supports.

Creating Anchor Supports

As discussed above, there is a need for a new support structure generation method which uses sliced data and voxels and pixel information to construct optimally distributed support structures that require minimal human interaction, exact positioning of the supports to the part geometries, and the use of various support geometries (i.e., different cross-sectional sizes, and variation in size with support height).

FIG. 21A shows an example schematic side view of an example part 50 supported by a prior art support structure SS that includes numerous supports 30. Part 50 is tilted by an angle of 59° while the support angle of structure SS is 60°, leading to an insufficient number of supports. FIG. 21B is similar to FIG. 21A, but illustrates an example embodiment of a prior art support structure SS where part 50 is tilted by 61° while the support angle is 60° and where there are far more supports 30 than actually required.

FIG. 22 is a schematic diagram of an example part 50 wherein the support 30 is calculated in a manner according to the prior art that results in a mismatch between the support and the part. This mismatch needs to be identified by an operator and corrected, which is an inefficient and time-consuming method.

FIG. 23 is a flowchart 100 of an example method of creating anchor supports that use sliced data, voxels and pixels. Step 101 of the method includes applying compensation or correction to the stereolithographic or other computer representation of part 50 (i.e., the "STL") if needed. Such compensation might be needed, for example, if the part is subject to "overcuring" that changes the geometry of the part as compared to an ideally formed part as represented by the STL (e.g., CAD file). Here, the STL can be considered the 3D boundary of the part. If a part is imaged perfectly to fit these boundaries the part will come out too small because the liquid resin shrinks when it is transformed to solid. Thus, as a first step a "shrink factor", is used, e.g., 0.4% in all directions on the STL. After the STL is sliced into layers the issue turns to how accurately the imaging system represents the slices. In this regard, there are two main concerns. The first is that the imaging system has distortion so that the X and Y scales can be too short or too long. Second, the pixels are coarse compared to the desired placement of the image boundaries, so the gray scale is adjusted for the boundary pixels, using pixel blending, to correctly locate the borders. The "shrink factor" or "compensation" seeks to address these two concerns.

Step 102 involves slicing the STL to generate part voxels VP to create a voxel representation of the part and support anchors. Here, a "voxel" V is an elemental volume unit and represents a 3D part surface element and support element, as shown in FIG. 24. Voxels V are denoted by three-dimensional cubes. Voxels V contain information of z height (z) and grid indices (ix and iy) on the X-Y plane. Part voxels VP represent the boundary of the STL model. Support voxels VS represent the support anchors interfacing part 50. Steps 103 and 104 involve creating two-dimensional layer and pixel data, and applying the aforementioned compensation to the STL if needed. Boundary support voxels are indicated by VBS.

In these steps, the STL model is sliced into part voxels VP along the X and Y directions. Part voxels VP are classified into up-facing voxels VPU and down-facing voxels VPD, wherein the down-facing voxels face build pad BP. An example of generating part voxels is shown in FIG. 24.

Step 105 involves creating support voxels VS. This includes determining the support anchors AS using the actual sliced data (layered pixels P generated from the voxels V) by considering self-support distance, accumulate-support distance, and region identification as shown in the schematic diagram of FIG. 25 of an example part 50 being built relative to build pad BP. The detailed implementation is given in the following steps A-E, which are repeated for all layers. Step 106 involves generating the support structures.

An example of an STL model and two to-be-processed layers is shown in the schematic perspective-view and side-view diagram of FIGS. 26A and 26B, respectively. A sample of constructing support voxels VS from part voxels VP are given in the pictorial flow diagram 150 of FIG. 27, which is described as follows (CL=current layer, PL=previous layer).

In step A, the next layer (Layer# N+1) of pixels is obtained by converting 3D part voxels VP into 2D pixels P using current layer CL and previous layer PL. Part voxels VP are always paired with one up-facing part voxel VPU and one down-facing voxel VPD. Any pixel P on a layer between a pair of up-facing and down-facing voxels should be considered "ON"; otherwise, it is "OFF".

In step B, regions R of pixels P (on Layer# N+1) that do not share a common continuous region of current layer (Layer# N) (shown in black in step B of FIG. 27) are identified and isolated.

In step C, part pixels P on Layer# N+1 that are either directly supported by part pixels on Layer# N or self-supported by the neighboring pixels (boundary pixels indicated by hatching) are found.

In step D, part pixels next to down-facing part voxels VPD that are neither supported by a previous layer nor self-supported by neighboring pixels, are found.

In step E, pattern support voxels VPS and boundary support voxels VBS are constructed. Pattern support voxels VPS represent the support anchors at the predefined location, while boundary support voxels VBS represent the support anchors at the non-predefined locations. Steps D and E show regions in the current layer CL supported by previous layer PL (top) along with region needing new support in the current layer (bottom). This generates support voxels VS.

With reference to flowchart 100 of FIG. 23, step 106 involves creating supports 30 using the actual sliced layer and pixel data (after X- and Y-shrinkage compensation, X-compensation, and geo-correction, if necessary) instead of using original STL models in steps 101 and 104. Hence, no geometry offset exists between part geometry and support tips (discussed below) since the support voxels VS are always overlapped with a part voxel VP.

A next step in the method involves apply Z-compensation by moving down-facing voxels VPD by a certain compensating distance (based on material and geometry) to compensate for overcuring, as shown in FIG. 28.

In the next step, the STL models are snapped to the support pattern grid SPG, as shown in FIG. 29, so that the resulting support tips always interface with parts at the same location wherever they are placed.

At this point, the size of pixels P and voxels V can be varied based on the geometry of the part and slice layer, i.e., one part can have multiple sized voxels V or pixels P. Voxels V with varying thickness can be used to realize adaptive slicing wherein the layer thickness is determined by the part geometry and manufacturability to significantly reduce the build time. This method applies even if the down-facing region is a surface, a line, or a point.

Utilizing Anchor Supports to Obtain Various Support Styles

An aspect of the present invention involves using a support style converter to convert the resulting support anchors AS into various support styles (i.e., geometries) which include support patterns in varying support thickness as function of height (i.e., in the Z-direction), support tips, reinforcement structures, and branching. The support anchors AS are represented by support voxels VS.

This conversion method is critical for FTI technology because single-pixel supports 30 grown upward from the build pad generally cannot survive because the support can bend more as its length increases. This is especially relevant in FTI technology since only air surrounds the supports. In an example embodiment, the style conversion from the anchor supports is achieved through the following method as defined by eight steps.

The first step involves converting support anchors AS into support structures 30. As discussed above, support anchors AS are represented by support voxels VS. The support patterns are created from support voxels VS and part voxels VP, such as illustrated in the schematic diagram of FIG. 30. The support pixels PS are turned "ON" if they fall between a support voxels VP and the build pad BP, or between a voxel pair of a support voxel VS and part voxel VP.

A second step involves varying the support patterns SP along the Z-direction. The support pattern SP at a given layer L is selected from available patterns according to the support style and current support height. The support structures 30 have thick patterns close to the build pad BP to ensure the support is strong enough to be attached to the build pad as well as be sustained during the build method. In an example embodiment, support structure 30 has a thickness that gradually decreases with distance away from build pad BP. In an example embodiment, single-pixels P are used in support structure 30 in the region of the support that is adjacent part 50 (i.e., the "support tip" 30T) to avoid large-size support bumps on the part when the supports are removed. Note that in FIG. 30 and in the other Figures, an "upward facing" pixel or voxel is one that faces the build pad BP, while a downward facing pixel or voxel is one that faces away from the build pad.

Also, in an example embodiment the single-pixel portion of support 30 is grown into part 50 for a few layers to ensure a strong attachment between the support and the part. This is referred to as a "support anchor" AS.

Figure 31A:
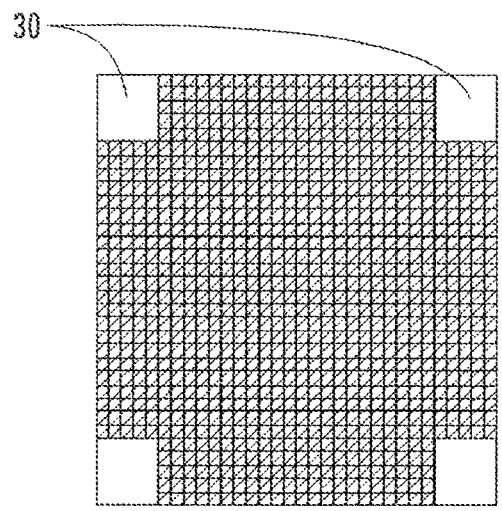
Figure 31B:
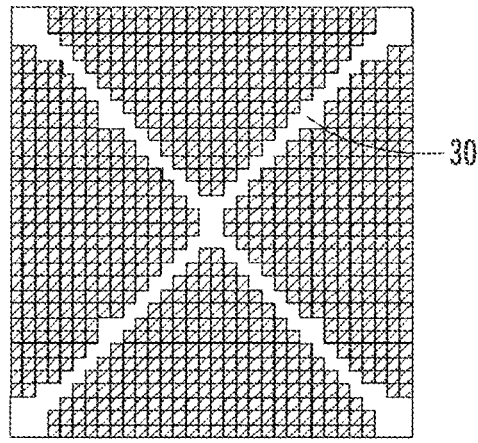
Figure 31C:
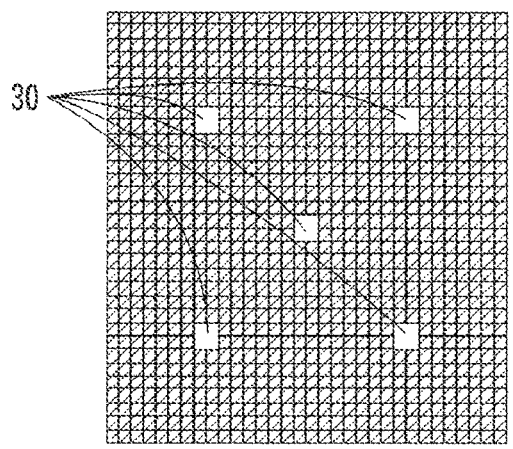
Figure 31D:
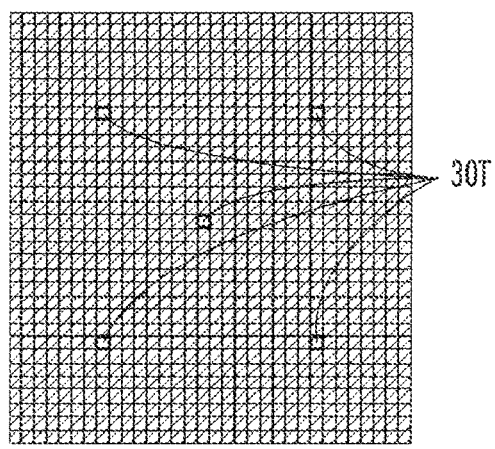

A typical support 30 includes base section 30B, a central long section 30L, and a tip section 30T that in an example embodiment constitutes the single-pixel tip and a portion of the tip growing into the part as an anchor AS, as shown in FIG. 30. An example base section 30B includes 25 layers of stub and 4 layers of lattices. An example long section 30L includes long post layers growing from Layer#26 up to 10 layers from the part and periodic reinforcement structures. An example tip section 30T starts from 10 layers before the part layer and grows into the part for 3 layers. Cross-sections of the different structure sections are shown in FIGS. 31A through 31D, in which the support structure comprises fifty layers (layers L1-L50) in the exemplary embodiment. FIG. 31A illustrates the pattern for "stub" supports (layers L1-L25). FIG. 31B illustrates a pattern for a "lattice" support 30 (layers L26-L29). FIG. 31C illustrates a pattern for "long posts" (layers L30-L40). FIG. 31D illustrates support tips 30T (layers L41 to L50) that attach to part 50. Further embodiments of the present invention include fewer, additional, and/or alternative types of supports between the build pad and part and/or include alternative numbers of layers as needed.

A third step involves forming a single-pixel support tip and/or a sub-pixel support tip 30T. Usually, only single-pixel support tip 30T interfaces with part 50 at both up-facing part surfaces 50U and bottom-facing surfaces 50B, as shown in FIG. 30 and FIG. 32, to reduce the size of support bumps on the part surfaces and to make the supports easy to remove from the part while also making the part easy to clean.

A sub-pixel support tip 30T can be created by using a low-intensity light spot, e.g., a low gray-value pixel, to make the cured area smaller, as shown in the gray-scale GS and resulting support tip 30T of FIG. 33.

A fourth step involves forming multi-pixel support anchors AS. Multi-pixel support anchors in various patterns can be formed to enhance the supports where they interface with part 50. The selection of patterns (geometry) for anchors AS is based on the properties of the supported areas, such as size, stress concentration, etc. Typical designs of the anchor patterns on 9 by 9 pixels are shown in FIG. 34 and can be instantiated on 32 by 32 pixels. All the given designs indicate the anchor section of the supports. These designs can be mixed and matched to design other types of anchor supports AS.

The actual supports 30 for the given surfaces may not be uniform, i.e., some supports can be made thicker than the others so that the thicker supports keep part 50 in place while the others serve to support the layer being built, as shown in FIG. 35. Sub-pixel support tips 30T may be used to reduce the bump size formed on part 50, as shown in FIG. 33.

In an example embodiment, it may be useful to add support reinforcement between supports 30. The long section 30L of support 30 is thicker, e.g., 2-pixel wide, and has reinforcement among them as shown in FIG. 30. The reinforcements in the form of support posts 30P between supports 30 at the long section 30L greatly strengthen the support structures. For FTI technology, reinforcement only happens between the support posts 30P within the same support grid to avoid long reinforcing lines. A typical reinforcement pattern that uses support posts 30P is shown in the cross-sectional view of FIG. 36.

In an example embodiment, non-anchor support tips 30T are grown into the last layer of part 50 for anchor-like reinforcement. Certain embodiments of the present invention do not include support tips 30T that are grown into part 50; however, for the illustrated embodiments including support anchors AS, the anchors generally increase the strength of the supports. Hence, the number of the support tips 30T interfacing with part 50 can be greatly reduced, especially, for parts with curved surfaces. An example is illustrated in the schematic side view of FIG. 37. In an example embodiment such as shown in FIG. 30, support tip 30T is anchored to the part at an anchor AS that is one to four layers deep into the part.

Due to the boundary support tips 30T not being coincident with a predefined support pattern, the boundary support must be branched from the predefined pattern. One solution is to branch the boundary support tips 30T from the support pattern at the last layer of reinforcement. This reduces the number of supports 30 and also reduces the possibility of blocking UV light during the build, as illustrated in FIG. 37. The trapped resin between two neighboring supports 30 can be significantly reduced using this approach.

Advantages of Using Sliced Layers and Pixels

The generation of supports that employ anchor supports as described above provides a number of advantages. A first advantage is that the support generation requires less human interaction because it can be automated, or performed in a manner that requires much less human interactions to edit supports as compared to present-day support-generation techniques. This tremendously increases the system throughput, and makes it possible to realize fast, quick, easy-to-use and office-friendly SFF systems.

Another advantage is that it greatly reduces the density of the supports without compromising build quality. The support generation with anchor supports AS (constructed using sliced data) takes into account self-support distance, accumulating-support distance, and region identification. The support distribution has been optimized (effectively and efficiently supported) with consideration given to part manufacturability, without compromising the part quality.

Another advantage is that the support tips 30T exactly interface with the part geometry. The sliced layer data, after compensation and geo-correction, is used to position the support anchors and generate the support structures. Thus, no offset exists between the built geometry and support locations.

Another advantage is that the support style converter can be used to convert support anchors into various support build styles, including support patterns having varying support thickness (see, e.g., FIG. 30), single-pixel or sub-pixel support tips, reinforcement structures, and branching structures. In addition, the resulting support tips 30T always interface with the parts at the identical positions regardless of part locations.

FIG. 38 illustrates an actual part 50 in the form of a fan made according to the present invention, while FIG. 39 through FIG. 42 show supports 30 for the fan part for various cross-sectional layers. Fan part 50 has eight blades 52 each having a curved shape. The supports 30 are optimally distributed—with neither excessive supports nor insufficient supports—to effectively and efficiently support the fan part both during and after the building method. In FIG. 39, the support reinforcements are shown as "X" while the pattern and boundary support tips are shown as black dots.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A method of supporting on a build pad a part formed by solid freeform fabrication (SFF), comprising:
    defining a plurality of layers that make up the part;
    for at least one layer, determining regions that require support by determining one or more portions of the layer that are self-supporting;
    merging regions of different layers into one or more common regions for the part; and
    providing at least one support for the one or more common regions, wherein providing at least one support comprises:
        identifying one or more local maxima of the part;
        identifying at least one island associated with the local maxima;
        identifying a largest cross-section for the island and a corresponding number of pixels for the largest cross-section for the island; and
        defining a total number of support pixels required to adequately support the island.

2. A method in accordance with claim 1, wherein the regions are defined by one or more pixels, and further comprising:
    for at least one layer, analyzing a steepness associated with the one or more pixels and identifying those pixels having associated therewith a sufficient steepness to be deemed self-supporting.

3. A method in accordance with claim 2, wherein analyzing steepness includes establishing steepness in orthogonal directions within the layer, and deeming those pixels having a threshold steepness in both orthogonal directions within the layer to be self-supporting.

4. A method in accordance with claim 1, wherein the one or more common regions have an associated size, and wherein providing the at least one support for the common regions includes:
    providing the at least one support with a cross-sectional area in a range between 0.1% and 10% of the size of the corresponding common region.

5. A method in accordance with claim 1, further comprising:
    removing the part from the build pad;
    removing from the part the at least one support for the one or more common regions; and
    removing a part abnormality formed by the at least one support.

6. A method in accordance with claim 1, wherein the total number of support pixels required to adequately support the island is at least 1% of the number of pixels of the largest cross-section of the corresponding island.

7. A method in accordance with claim 1, further comprising:

providing at least one support for at least one local maximum.

8. A method in accordance with claim 7, further comprising:
calculating a centroid for the one or more common regions; and
providing at least one support at the centroid.

9. A method in accordance with claim 8, further comprising:
providing a number NS of surface supports, wherein:

$$NS=NT-(NM+NC),$$

where NT is a total number of support pixels required, NM is a number of local maxima support pixels required, and NC is a number of centroid pixels required.

10. A method in accordance with claim 1, wherein the at least one support has a cross-sectional size of between 4×4 pixels and 16×16 pixels.

11. A method in accordance with claim 1, wherein the at least one support has a base at a build pad and an anchor at the part, wherein the base has a larger cross-sectional size than that of the anchor.

12. A method in accordance with claim 1, further comprising determining support anchor locations for the at least one support.

13. A method in accordance with claim 1, wherein providing at least one support includes forming a support base attached to the build pad, and a support tip attached to the part, including forming the support base to be larger than the support tip.

14. A method in accordance with claim 13, further comprising forming the support tip to be smaller than a single pixel.

15. A method in accordance with claim 13, further comprising forming the support tip to have no more than a single pixel within ten layers or fewer from the part.

16. A method in accordance with claim 13, wherein the support tip is anchored to the part at an anchor that is one to four layers deep into the part.

* * * * *